US008769578B2

(12) United States Patent  
Lau et al.

(10) Patent No.: US 8,769,578 B2  
(45) Date of Patent: Jul. 1, 2014

(54) SYSTEMS AND METHODS FOR PROVIDING INTERACTIVE MEDIA GUIDANCE ON A WIRELESS COMMUNICATIONS DEVICE

(75) Inventors: Erwin Lau, Yuen Long (HK); Terry Tam, Kowloon (HK); Kay Chiu, Tai Po (HK)

(73) Assignee: United Video Properties, Inc., Santa Clara, CA (US)

( * ) Notice: Subject to any disclaimer, the term of this patent is extended or adjusted under 35 U.S.C. 154(b) by 479 days.

(21) Appl. No.: 12/495,522

(22) Filed: Jun. 30, 2009

(65) Prior Publication Data

US 2010/0333135 A1    Dec. 30, 2010

(51) Int. Cl.
*H04N 21/422* (2011.01)
*H04N 21/41* (2011.01)

(52) U.S. Cl.
CPC .... *H04N 21/42209* (2013.01); *H04N 21/42224* (2013.01); *H04N 21/4126* (2013.01)
USPC ................................. 725/42; 725/43; 725/133

(58) Field of Classification Search
CPC .................. H04N 21/4126; H04N 21/42209; H04N 21/42224
USPC .......................................................... 725/39
See application file for complete search history.

(56) References Cited

U.S. PATENT DOCUMENTS

| | | | |
|---|---|---|---|
| 4,825,209 A | 4/1989 | Sasaki et al. | |
| 5,073,931 A | 12/1991 | Audebert et al. | |
| 5,161,021 A | 11/1992 | Tsai | |
| 5,410,326 A | 4/1995 | Goldstein | |
| 5,410,367 A | 4/1995 | Zahavi et al. | |
| 5,619,251 A | 4/1997 | Kuroiwa et al. | |
| 5,710,605 A | 1/1998 | Nelson | |
| 5,794,174 A | 8/1998 | Janky et al. | |
| 5,812,931 A | 9/1998 | Yuen | |
| 5,926,115 A | 7/1999 | Schleder et al. | |
| 5,956,025 A | 9/1999 | Goulden et al. | |
| 6,097,441 A | 8/2000 | Allport | |
| 6,130,726 A | 10/2000 | Darbee et al. | |
| 6,313,887 B1 | 11/2001 | Gudorf | |
| 6,400,695 B1 | 6/2002 | Chuah et al. | |
| 6,407,779 B1 * | 6/2002 | Herz ............................. 348/734 |
| 6,437,836 B1 * | 8/2002 | Huang et al. ................. 348/734 |
| 6,484,011 B1 | 11/2002 | Thompson et al. | |

(Continued)

FOREIGN PATENT DOCUMENTS

DE    4 129 571    3/1993
DE    41 29 571    3/1993

(Continued)

OTHER PUBLICATIONS

ISR and Written Opinion in International Applicatin No. PCT/US2010/038254 dated Jan. 14, 2011.

(Continued)

*Primary Examiner* — Bennett Ingvoldstad
(74) *Attorney, Agent, or Firm* — Ropes & Gray LLP

(57) ABSTRACT

A wireless communications device provides users with opportunities to access interactive media guidance or other applications and to control interactive media guidance applications running on user equipment. The wireless communications device may have a touch-sensitive screen with controls that are coordinated with the features of the interactive media guidance or other applications. The wireless communications device may function as a remote controller for user equipment.

18 Claims, 19 Drawing Sheets

(56) References Cited

U.S. PATENT DOCUMENTS

| | | |
|---|---|---|
| 6,504,580 B1 | 1/2003 | Thompson et al. |
| 6,532,592 B1 | 3/2003 | Shintani et al. |
| 7,170,422 B2 | 1/2007 | Nelson et al. |
| 7,375,673 B2 | 5/2008 | Spilo |
| 7,523,475 B2 | 4/2009 | Allport |
| 7,827,319 B2 | 11/2010 | Kimura et al. |
| 7,913,278 B2 | 3/2011 | Ellis et al. |
| 7,917,528 B1 * | 3/2011 | Dave et al. .................... 707/766 |
| 2003/0234737 A1 | 12/2003 | Nelson et al. |
| 2004/0073340 A1 | 4/2004 | Ueda et al. |
| 2006/0041915 A1 | 2/2006 | Dimitrova et al. |
| 2007/0124772 A1 * | 5/2007 | Bennett et al. .................. 725/61 |
| 2008/0178224 A1 * | 7/2008 | Laude et al. .................... 725/44 |
| 2009/0099698 A1 | 4/2009 | Masui et al. |
| 2010/0026569 A1 | 2/2010 | Amidi |
| 2010/0035559 A1 | 2/2010 | Nakano et al. |
| 2010/0180307 A1 * | 7/2010 | Hayes et al. .................... 725/51 |
| 2010/0251303 A1 | 9/2010 | Ellis et al. |
| 2010/0328132 A1 | 12/2010 | Reams et al. |
| 2011/0179435 A1 | 7/2011 | Cordray et al. |
| 2011/0185392 A1 | 7/2011 | Walker |
| 2011/0287757 A1 | 11/2011 | Nykoluk et al. |

FOREIGN PATENT DOCUMENTS

| | | |
|---|---|---|
| EP | 0 399 897 | 11/1990 |
| EP | 0 472 400 | 2/1992 |
| WO | WO 94/03020 | 2/1994 |
| WO | WO 94/22242 | 9/1994 |
| WO | WO 98/16062 | 4/1998 |
| WO | WO 98/44477 | 10/1998 |
| WO | WO 00/17737 | 3/2000 |
| WO | WO 03/054679 | 7/2003 |
| WO | WO 2007/078503 | 7/2007 |

OTHER PUBLICATIONS

PCT International Search Report, Intl. Application No. PCT/US97/18187 (WO 98/16062), Feb. 10, 1998, 2 pgs.

PCT Notification of Transmittal of International Preliminary Examination Report, Intl. Application No. PCT/US97/18187, 08 (WO 98/16062), Jul. 1999, 9 pgs.

Supplementary European Search Report, Application No. EP 97911643, Aug. 9, 1999, 3 pgs.

* cited by examiner

SYSTEMS AND METHODS FOR PROVIDING INTERACTIVE MEDIA GUIDANCE ON A WIRELESS COMMUNICATIONS DEVICE

BACKGROUND OF THE INVENTION

This invention relates to interactive media guidance application systems, and more particularly, to interactive media guidance application systems in which media guidance application functionality may be provided by a wireless communications device or coordinated between a wireless communications device and one or more user equipment devices.

Interactive media guidance applications are typically implemented, at least in part, on a user's equipment (e.g., a set-top box). Examples of interactive media guidance applications include interactive program guides, e-mail, home shopping, wagering and other e-commerce applications, financial applications, Web browsers, games, and other user equipment based applications. Running these applications typically excludes other users from watching media content other than the application being accessed. In addition, running such applications on a stationary platform on the user equipment may prevent users from accessing the features of such systems when away from the stationary platform.

SUMMARY OF THE INVENTION

In view of the foregoing, an interactive media guidance application system is provided that includes a wireless communications device with a display.

The wireless communications device may be any suitable wireless communications device, such as a touch-screen remote, personal digital assistant (PDA), mobile phone or other wireless communications device. The wireless communications device may provide a user with access to interactive media guidance application functionality remotely or while viewing media content.

In one suitable approach, the wireless communications device may run a client version of an interactive media guidance application that requests application data from an application server running on the user's equipment. In another suitable approach, the wireless communications device may act as an independent platform running an interactive application that may run independently and may communicate with a similar interactive application running on the user's equipment. The wireless communications device may provide, for example, a portable interactive media guidance application supporting various features of an interactive program guide, Internet-based program guide, and/or other suitable applications (e.g., a home shopping application).

Interactive media guidance applications may include, for example, applications that provide information related to media content or that provide interactive features associated with media content, such as, for example, interactive program guides, home shopping applications, wagering applications, e-mail, and financial trading applications.

In some embodiments, the wireless communications device may include a touch-screen LCD display, and one or more communication interfaces to communicate with user equipment such as, for example, a television, a computer, a media server, etc. The communication interfaces may include infrared, Bluetooth, Wi-Fi, or any other suitable interface. A visual keypad may be displayed on the touch-screen display, and the user may touch the visual keypad to form search strings and generate commands. The keys may be context sensitive, where only the keys of interest are displayed at any time. In some embodiments, the communication interfaces may allow a user to use the wireless communications device as a remote control to operate one or more user equipment devices. The wireless communications device may interface with multiple devices simultaneously in some embodiments. The wireless communications device may also automatically determine the appropriate device (e.g., television, set-top box, media server, etc.) that should receive a command (e.g., a channel up command) based on the keys touched or clicked by the user. Furthermore, the wireless communications device may detect its distance from each user equipment device to determine the appropriate device to receive the command. The distance may be determined using, for example, an RFID discovery protocol, GPS, or a wireless location-based service.

The wireless communications device may support many of the features of interactive program guides, such as listings by time, by channel, by category, favorite channels or any other guide feature without interrupting media content being presented on user's equipment. It may allow the user to set reminders and have them appear on the wireless communications device, with both an audio alert and a display. Via a paging return, for example, the device can be used to set reminders or schedule recordings remotely. The wireless communications device may also be used for collecting data. For example, it might be used to send out surveys. It may also be used to collect audience ratings information. In some embodiments, the wireless communications device may be combined with a suitable point-of-purchase device, for example, in order to distribute electronic coupons and other incentives.

The wireless communications device may also offer other smart-phone-type functions. For example, it may support e-mail, a calendar, a contact list, web browsing, a calculator, or any other suitable application. It may support data services, such as news, weather, sports, traffic, or any other suitable data service. It may also be used as a pager.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
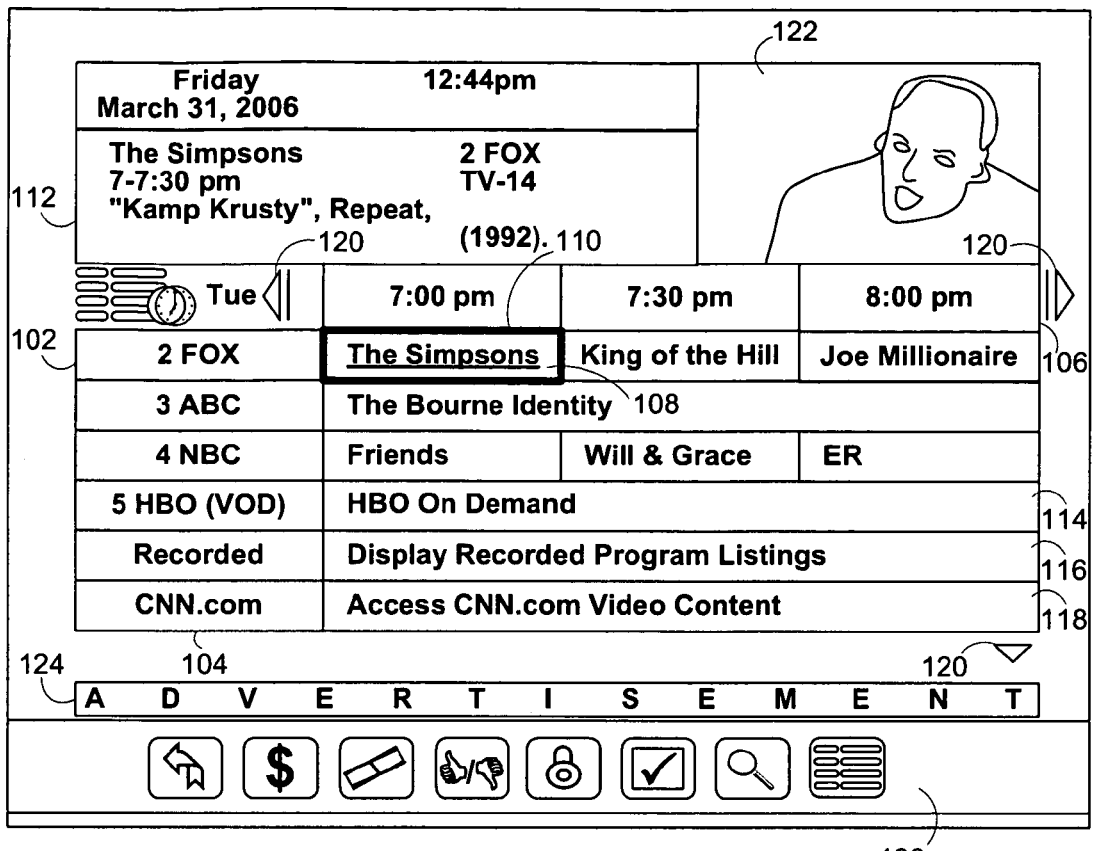
FIG. 1 shows an illustrative display screen using a grid format that may be used to provide guidance for various types of media in accordance with one embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held devices such as, PDAs, mobile telephones, or other mobile devices. The various devices and platforms that may implement media guidance applications are described in more detail below.

Figure 2:
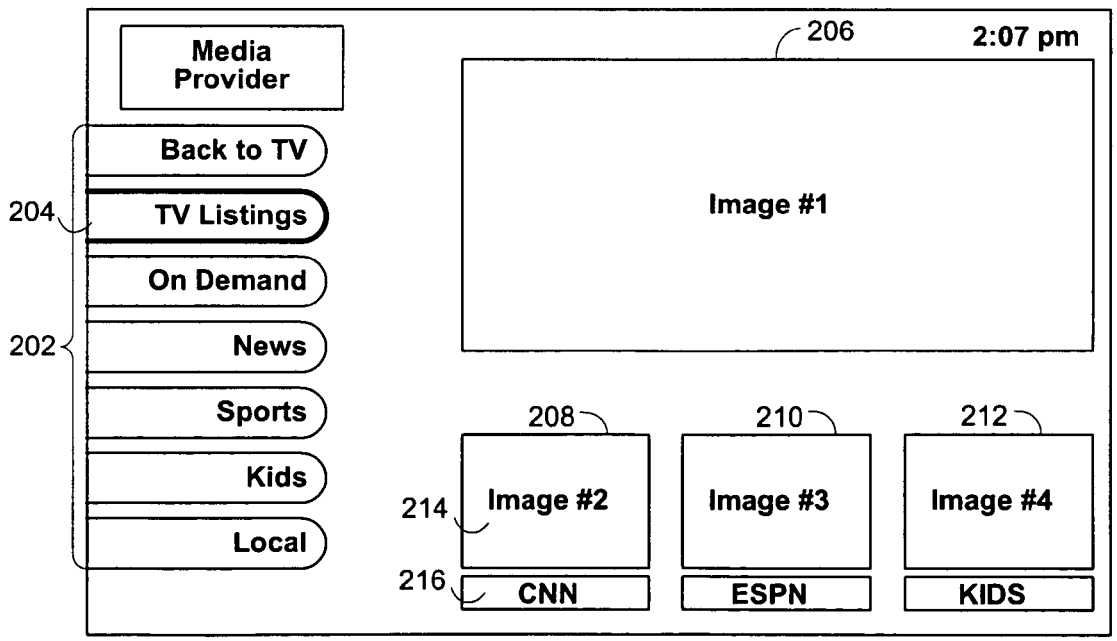
FIG. 2 shows an illustrative display screen using a mosaic that may be used to provide guidance for various types of media in accordance with an embodiment of the present invention.

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 402. Information relating to the program listing selected by highlight region 402 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
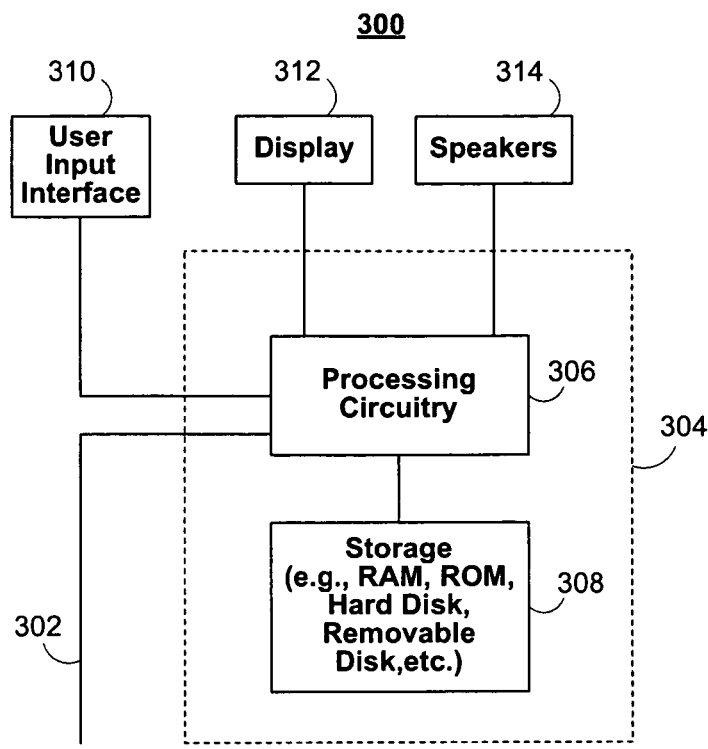
FIG. 3 shows an illustrative user equipment device in accordance with an embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry (e.g. Bluetooth) that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
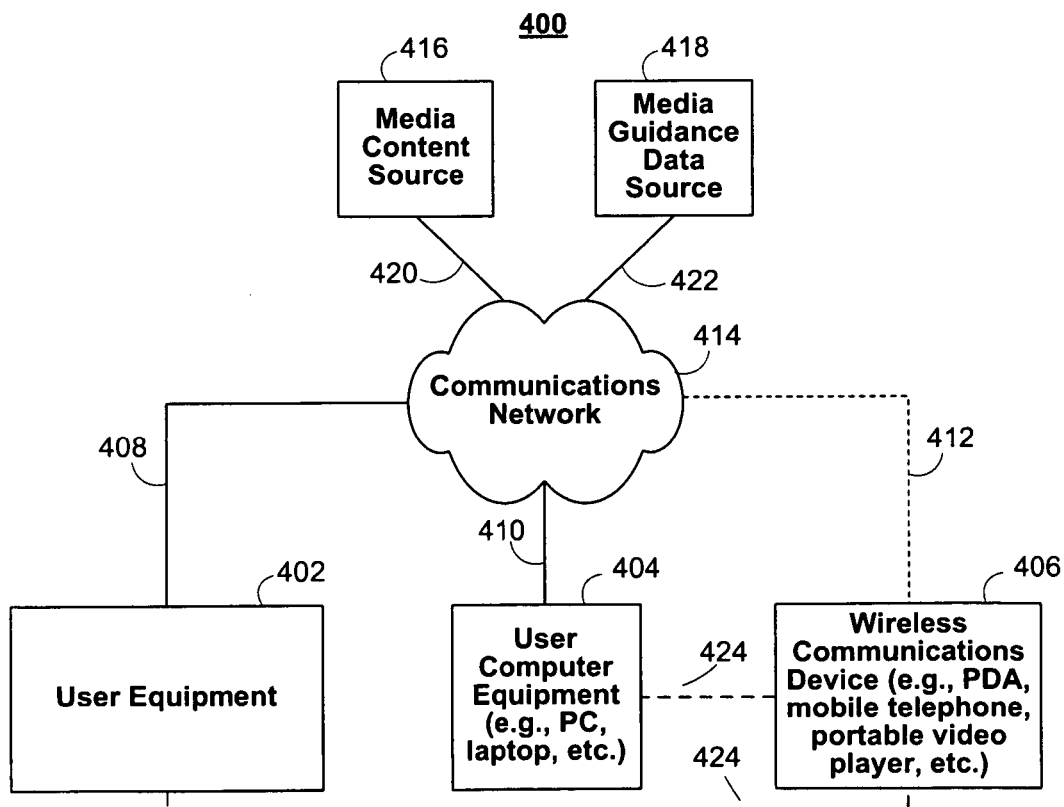
FIG. 4 shows a simplified diagram of an illustrative interactive media system in accordance with an embodiment of the invention.

User equipment device 300 of FIG. 3 can be implemented in system 400 of FIG. 4 as user equipment 402, user computer equipment 404, wireless communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User equipment 402 may include a set-top box, an integrated receiver decoder (IRD) for handling satellite television, a television set, a digital storage device, a DVD recorder, a video-cassette recorder (VCR), a local media server, or other user equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless communications device 406 may include PDAs, a mobile telephone, a portable video player, a portable music player, a portable gaming machine, or other wireless devices. Wireless communications device 406 may function as a remote controller of user equipment 402. Remote control commands entered using the touchscreen of wireless communications device 406 may automatically be sent to the appropriate device based on the command entered. For example, if a user enters a channel up command, wireless communications device 406 may automatically determine a television should be the recipient of the command. Additionally, wireless communications device 406 may determine which device should receive a command based on it's proximity to a device. For example, if wireless communications device 406 is closest to a set-top box, it may determine that the entered command is intended for the set-top box. The distance may be determined using, for example, RF ID or GPS.

It should be noted that with the advent of television tuner cards for PC's, WebTV, and the integration of video into other user equipment devices, the lines have become blurred when trying to classify a device as one of the above devices. In fact, each of user equipment 402, user computer equipment 404, and wireless communications device 406 may utilize at least some of the system features described above in connection with FIG. 3 and, as a result, include flexibility with respect to the type of media content available on the device. For example, user equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user equipment 402, user computer equipment 404, and wireless communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

User equipment devices may communicate directly with each other via communication paths, such as those described above in connection with paths 408, 410, and 412, as well other short-range point-to-point communication paths 424, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. For example, wireless communication device 406 may transmit and receive remote control commands to and from user equipment 402 via infrared. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device (e.g., wireless communications device 406). For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user equipment 404 and user computer equipment 406 may access the media guidance application to navigate among and locate desirable media content. Users may also access the media guidance application outside of the home using wireless communications devices 406 to navigate among and locate desirable media content.

It will be appreciated that while the discussion of media content has focused on video content, the principles of media guidance can be applied to other types of media content, such as music, images, etc.

As used herein, a "primary" application is intended to mean an interactive application that runs on user equipment 402 and/or user computer equipment 404. A primary application may be a server application that provides application data to wireless communications device 406 in response to one or more application communications, or may be a version of an application that works cooperatively with a version of the application that runs on wireless communications device 406. As used herein, a "secondary" application is intended to mean an interactive application that runs on wireless communications device 406. A secondary application may include a client application that obtains data from a primary application, or may be a version of an interactive application that runs cooperatively with a primary application and that obtains application data from media content source 416 or media guidance data source 418.

The primary and secondary applications may communicate by exchanging one or more application communications. Application communications may include any client-server or peer-to-peer communication construct suitable for exchanging interactive application data or other data (such as digital frames and display screens for display by wireless communications device 406) between the primary and secondary applications via communications path 424 or via communications network 414 through communications paths 412 and 408. Communications path 424 may be an infrared link, a Wi-Fi link, a Bluetooth link, a combination of such links, or any other suitable wireless communications link. Application communications may include, for example, requests, commands, messages, or remote procedure calls.

Application communications may also involve complex communications between application constructs running on wireless communications device 406 and user equipment 402 and/or user computer equipment 404. Application communications may, for example, be object based. Objects running in the primary and secondary guides, for example, may communicate using an Object Request Broker (ORB). Interactive application data may, for example, be encapsulated as component object model (COM) objects and persisted to a stream that is transmitted over communications path 424 and/or communications network 414. Application communications may also include, for example, HTML formatted markup language documents (e.g., Web pages), that are exchanged between wireless communications device 406 and an Internet service system.

User equipment 402 (and/or user computer equipment 404) and wireless communications device 406 may communicate over communications path 424. There may only be a single communications path 424, such as when wireless communications device 406 obtains application data exclusively from user equipment 402. Additionally or alternatively, wireless communications device 406 may obtain application and media content data directly from media content source 416 or media guidance data source 418 via, for example, communications network 414.

Various different media and schemes may be used on different communications paths 424 when there are multiple communications paths 424. In the home, for example, communications path 424 may include an RF, infrared or Bluetooth link instead of a more complicated link that is better suited for data transmission over wider geographical areas. It may also be more suitable, for example, that when wireless communications device 406 communicates directly with media content source 416 or media guidance data source 418, communications path 424 may be a link more suited for data transmission over wider geographical areas, such as an Internet link.

Wireless communications device 406 and user equipment 402 may communicate using any suitable network and transport layer protocols. They may communicate, for example, using a protocol stack which includes Sequenced Packet Exchange/Internetwork Packet Exchange (SPX/IPX) layers, Transmission Control Protocol/Internet Protocol (TCP/IP) layers, AppleTalk Transaction Protocol/Datagram Delivery Protocol (ATP/DDP) layers, a Wireless Access Protocol (WAP) layer, or any other suitable network or transport layer protocols. Wireless communications device 406 and user equipment 402 may also be part of an in-home network using, for example, the Jini networking protocol by Sun Microsystems. Network and transport layer protocols may be omitted from the system if desired. In various embodiments, wireless communications device 406 and user equipment 402 may be DLNA and UVNP compliant devices.

Application data may be distributed by media guidance data source 418 to user equipment 402 exclusively, to user equipment 402 and wireless communications device 406 jointly, or to just wireless communications device 406, using any suitable scheme. For example, application data may be provided in a continuous stream or may be transmitted at a suitable time interval (e.g., once per hour). If transmitted continuously, it may not be necessary to store the data locally on user equipment 402 or wireless communications device 406. Rather, user equipment 402 or wireless communications device 406 may extract data "on the fly" as it is needed. If desired, media content source 416 or media guidance data source 418 may poll user equipment 402 or wireless communications device 406 periodically for certain information (e.g., pay program account information or information regarding programs that have been purchased and viewed using locally-generated authorization techniques). Application data may also be provided using a suitable client-server approach or the Internet.

In various embodiments, a primary application may run totally on user equipment 402 and/or user computer equipment 404. A secondary application running on wireless communications device 406 may obtain application data via user equipment 402 and/or user computer equipment 404. The secondary application may obtain application data from a primary application acting as a server via application communications sent to user equipment 402 or user computer equipment 404 via communications path 424. In another suitable approach, the secondary application may obtain application data directly from user equipment 402 or user computer equipment 404 without involving the primary application.

User equipment 402 may, for example, receive application data as part of a continuous data stream, periodically, or in response to polling requests from media content source 416 or media guidance data source 418. In such approaches, application data may be automatically provided to wireless communications device 406 without requiring the secondary application to request it from the primary application.

In still another suitable approach, application data may be stored by user equipment 402 and forwarded to wireless communications device 406. This approach may be desirable when, for example, the transfer rates of data between distribution facility 104 and user equipment 402, and between user equipment 402 and wireless communications device 406 are unequal.

Figure 5:
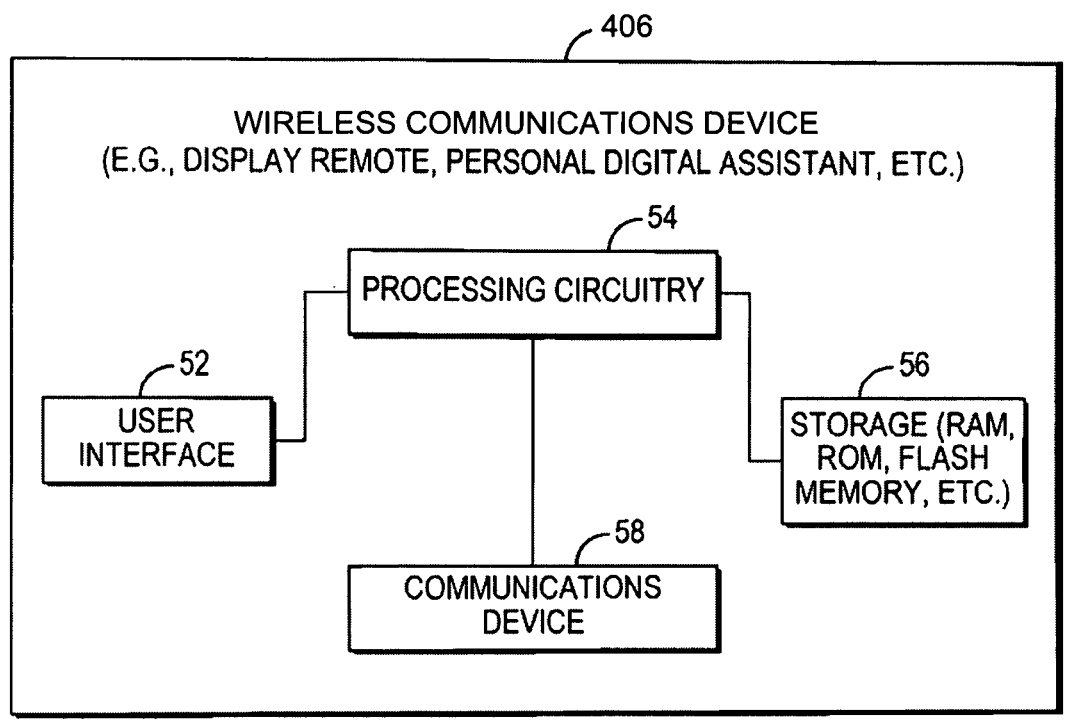
FIG. 5 shows a schematic view of the wireless communications device of FIG. 4, in accordance with an embodiment of the present invention.

An illustrative arrangement for wireless communications device 406 is shown in FIG. 5. Wireless communications device 406 may be any suitable PDA, mobile telephone, portable video player, portable music player, portable gaming machine, or other portable wireless device. The functionality that wireless communications device 406 may provide to the user may vary depending on its processing circuitry, communications circuitry and memory. Hand-held application device 406 may be a Windows CE compliant or JAVA-based hand-held PDA style device or smartphone, or may be enabled by any other suitable software operating system for wireless communications devices. Wireless communications device 406 may include user interface 52, processing circuitry 54, storage 56, and communications device 58.

User interface 52 may be any suitable input or output device or system, and may include a liquid crystal display (LCD), touch sensitive screen, voice recognition and synthesis circuitry, microphone, speaker, manual buttons or keys, keyboard, or any other suitable user input or output hardware and software. User interface 52 preferably includes a touch sensitive screen or keypad. A touch sensitive screen may simplify navigation within various types of interactive television applications. In some embodiments a touch sensitive screen of wireless communications device 406 need only display those buttons or controls that apply to the specific screen that the user is viewing or the specific task that the user is performing. In addition, an interface displayed on a touch sensitive screen may change to suit the type of data entry the user is going to perform in the television application. For example, a keyboard may be displayed to provide a user with an opportunity to enter one or more characters, or a number pad may be displayed to simplify numeric entries. User interface 52 may also include suitable handwriting recognition software for running on a wireless communications device.

In still another suitable approach, wireless communications device 406 may have a combination of push buttons and displays. The displays may label each push button with text or graphics to indicate to the user the feature associated with a push button. When the user accesses different interactive applications, the displays may change based on the application accessed.

When, for example, an interactive wagering application is accessed, two displays may read "bet" and "info." When the user changes applications to, for example, an interactive program guide, the same displays may read "channel up" and "channel down." For each application, pressing a given push button results in performing the indicated feature. Control codes may be downloaded from, for example, user equipment 402 (FIG. 4) via a Bluetooth, infrared, Wi-Fi, or other wireless link to wireless communications device 406 to indicate to wireless communications device 406 the proper labels and features for each push button.

Processing circuitry 54 may include any suitable processor, such as an Intel Pentium®, AMD, or other microprocessor. Wireless communications device 406 may also include storage 56. Storage 56 may be any suitable memory or other storage device, such as RAM, ROM, flash memory, magnetic or optical disc drive or other storage suitable for a wireless communications device.

Wireless communications device 406 may also include communications device 58. Communications device 58 may be any device suitable for supporting communications between wireless communications device 406 and user equipment 402 over communications path 424 (FIG. 4) and between wireless communications device 406 (FIG. 4) and media content source 416 (FIG. 4) and media guidance data source 418 (FIG. 4) over communications path 412 (FIG. 4). Communications device 58 may be, for example, a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, cellular, or other suitable analog or digital transceiver), or other suitable communications device for a wireless communications device. In particular, communications device 58 may be a paging-frequency transceiver. If desired, wireless communications device 406 may include multiple communications devices 58. One communications device 58 may be used to communicate over communications path 412, and another may be used to communicate over communications path 424. Each communications device 58 may be for a different type of communications path. For example, one communications device 58 may be used to download application data or otherwise exchange access communications, and another communications device, such as an infra-red emitter, may be used to control user equipment 402 and other home entertainment equipment using infra-red controls. A paging-frequency emitter may be used, for example, to upload device type information and download infra-red codes. When used in this mode, keys may be displayed on wireless communications device 406, and the user may touch the keys on the screen to generate commands. The keys may be context sensitive, where only the keys of interest are displayed at any time.

In operation, wireless communications device 406 may obtain user commands from user interface 52, process the commands using processing circuitry 54, and output a suitable display screen to the user on user interface 52. When a user indicates a desire to access a function of the secondary application that requires the application to obtain application data, processing circuitry 54 may direct communications device 58 to initiate a session with user equipment 402 (FIG. 4), media content source 416 (FIG. 4) or media guidance data source 418 (FIG. 4).

Wireless communications device 406 may be configured to display, for example, a main menu, which may include interactive advertisements. One of the items on the menu may be an interactive program guide. Selecting the guide feature may bring up a guide main menu, display of program listings or any other suitable guide display. When a user selects a listing, the device may display a description of a program associated with the listing. Advertisements may be programming related, in which case selecting them may bring up more information about a program, allow reminders to be set, or any other suitable function. Advertisements for other products may allow a user to get more information or purchase a product.

Figure 6:
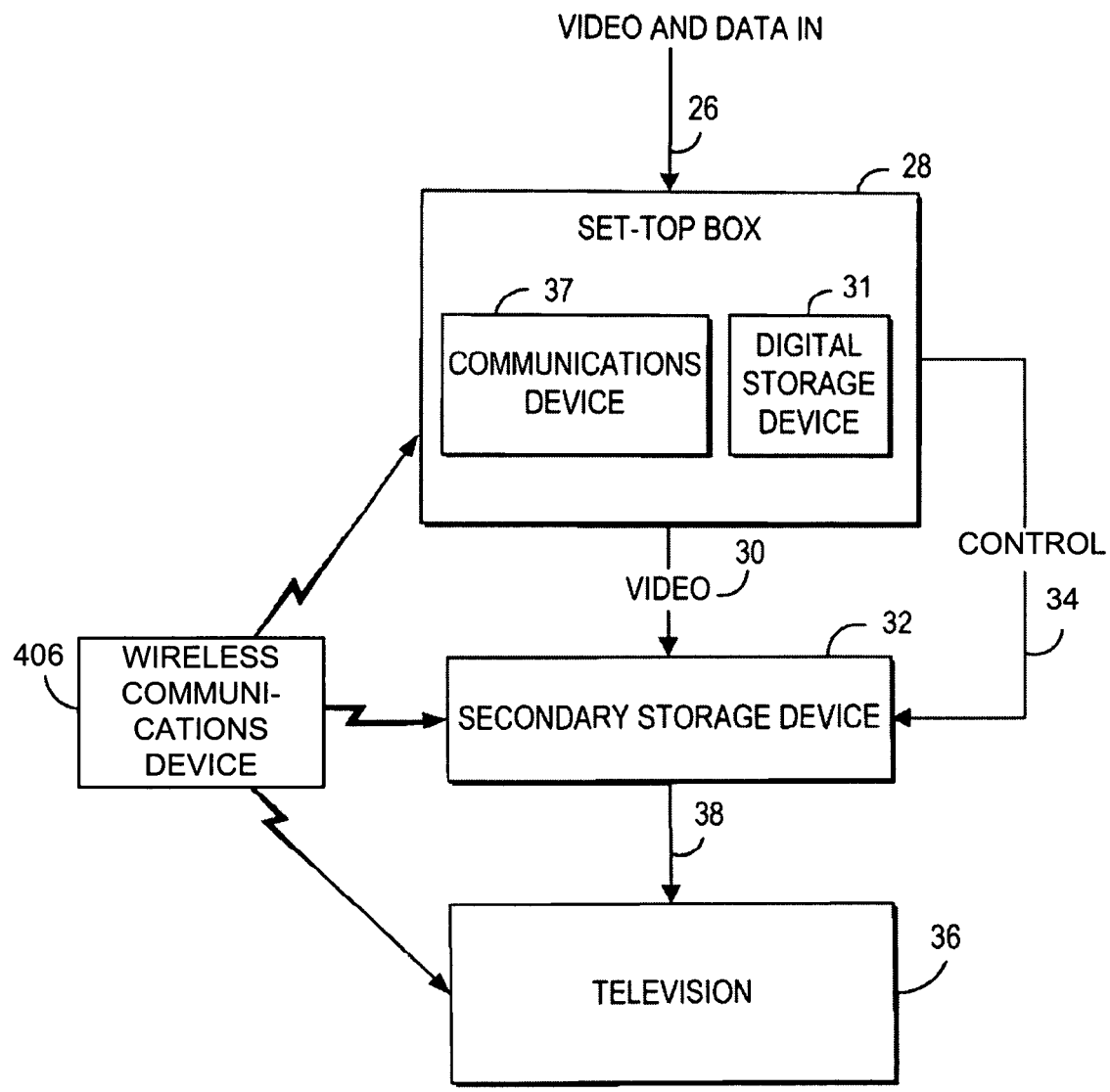
FIG. 6 shows a schematic view of the user equipment of FIG. 4, in accordance with an embodiment of the present invention.

An illustrative arrangement for user equipment 402 (FIG. 4) is shown in FIG. 6. User equipment 402 (FIG. 4) may receive analog video or a digital video stream from media content source 416 at input 26. Data from media guidance data source 418 may also be received at input 26. During normal television viewing, the user may tune user equipment (e.g., a set top box 28) to a desired television channel (analog or digital). The signal for that television channel may then be provided at video output 30. The signal supplied at output 30 is typically either a radio frequency (RF) signal on a predefined channel (e.g., channel 3 or 4), or a analog demodulated video signal, but may also be a digital signal provided to television 36 on an appropriate digital bus (not shown). The video signal at output 30 may be received by optional secondary storage device 32.

A primary application or primary application client may run on set-top box 28, on television 36, on optional digital storage device 31 (if television 36 or optional digital storage device 31 has suitable processing circuitry and memory), or on a suitable analog or digital receiver connected to television 36. The interactive television application may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital versatile disc (DVD) player, etc.). Program recording and other features may be controlled by set top box 28 using control link 34. If secondary storage device 32 is a videocassette recorder, for example, a typical control link 34 involves the use of an infrared transmitter coupled to the infrared receiver in the videocassette recorder that normally accepts commands from a remote control.

Wireless communications device 406 may be used to control set top box 28, secondary storage device 32, and television 36. Wireless communications device 406 may, for example, have different operation modes for operating as an interface to applications and for controlling user equipment 402 (FIG. 4) like a remote control. Wireless communications device 406 may be programmable based on, for example, the devices in media system 400 (FIG. 4). The user may, for example, select device types from within a suitable setup display. In another suitable approach, wireless communications device 406 (FIG. 4) may download configuration information from an application (e.g., an interactive media guidance application) running on user equipment 402.

If desired, the user may record programs, application data, or a suitable combination thereof in digital form on optional digital storage device 31. The user may also download software to digital storage device 31 from the Internet or some other medium. Digital storage device 31 may be a writeable optical storage device (such as a DVD player capable of handling recordable DVD discs), a magnetic storage device (such as a disk drive or digital tape), or any other digital storage device. Interactive television application systems in which program guides have digital storage devices are described, for example, in Hassell et al. U.S. patent application Ser. No. 09/157,256, filed Sep. 17, 1998, which is hereby incorporated by reference herein in its entirety.

Digital storage device 31 may be contained in set-top box 28 or it may be an external device connected to set-top box 28 via an output port and appropriate interface. If necessary, processing circuitry in set-top box 28 formats the received video, audio and data signals into a digital file format. Preferably, the file format is an open file format such as the Moving Pictures Expert Group (MPEG) MPEG-2 standard or the Moving Joint Photographic Experts Group (MJPEG) standard. The resulting data may be streamed to digital storage device 31 via an appropriate bus (e.g., a digital bus), and may be stored on digital storage device 31. In another suitable approach, an MPEG-2 data stream or series of files may be received from media content source 416 (FIG. 4) and stored in digital storage device 31. For example, files from programs recorded by the user using a remote media server at media content source 416 (FIG. 4) may be stored. Such digital files may be played back to the user when desired.

Television 36 may receive video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital video (e.g., a video for a program that was recorded by the user at a media server remote to or within the user's home), may be passed through from set top box 28, may be provided directly to television 36 via set-top box 28 if secondary storage device 32 is not included in user equipment 402, or may be received directly by television 36. During normal television viewing, the video signals provided to television 36 correspond to the desired channel to which the user has tuned with set top box 28. Video signals may also be provided to television 36 by set-top box 28 when set-top box 28 is used to play back information stored on digital storage device 31, or when set-top box 28 is used to decode a digital video stream, or digital files transmitted from television distribution facility 29.

Set-top box 28 may include communications device 37 for communicating directly with media content source 416 (FIG. 4) and media guidance data source 418 (FIG. 4) over communications path 408, or with wireless communications device 406 over communications path 424 (FIG. 4). Communications device 37 may be, for example, a communications port (e.g., a serial port, parallel port, universal serial bus (USB) port, etc.), modem (e.g., any suitable analog or digital standard modem or cellular modem), network interface card (e.g., an Ethernet card, token ring card, etc.), wireless transceiver (e.g., an infrared, radio, cellular, Bluetooth, or other suitable analog or digital transceiver), or other suitable communications device. Television 36 may also have such a suitable communications device if desired. In particular, communications device 37 may be a paging-frequency or 900 MHz transceiver. If desired, set-top box 28 may have multiple communications devices 37. One communications device 37 may be used to communicate with distribution facility 104, and another may be used to communicate with wireless communications device 406.

The primary and secondary applications may include any suitable applications including, without limitation, a home shopping application, web-browser, to-do list, wagering application, or any other application. For clarity, the present invention will be illustrated in connection with a system in which an interactive program guide application is implemented on user equipment 402 (FIG. 4) and wireless communications device 406 (FIG. 4). In one suitable arrangement for such a system, program guide data is distributed from media guidance data source 418 (FIG. 4) to an interactive program guide application implemented on user equipment 402 (FIG. 4). In another suitable arrangement, the interactive program guide application may be implemented using a client-server architecture in which the primary processing power for the application is provided by a server located at, for example, media guidance data source 418, and user equipment 402 acts as a client processor. In still another alternative arrangement, the interactive program guide application may obtain program guide data from the Internet.

Interactive program guides typically limit a user's ability to select interactive objects on a screen by requiring that objects be selected by positioning a highlight region or cursor over the objects. When, for example, a user is within a column of program listings, the user may not arrow above or below the column to select an interactive object. In addition, the user may be required to perform several key strokes to navigate from one object to another. On the touch sensitive display of wireless communications device 406, however, any area can be selectable, thereby providing the user with an increased ability to access interactive objects. Wireless communications device 406 may, for example, display a menu modeled after a menu displayed on user equipment 402 (FIG. 4) by an interactive application. The user may select a particular menu option with a single action without having to perform, as with a regular remote control, multiple keystrokes to position a highlight region.

Wireless communications device 406 (FIG. 4) may include many of the features of interactive program guides, such as listings by time, by channel, by category, favorite channels or any other guide feature. It may allow the user to set reminders and have them appear on the device, with both an audio alert and a display. Via a paging return, for example, the device can be used to set reminders or schedule recordings remotely. Wireless communications device 406 (FIG. 4) may be used for collecting data. For example, it might be used to send out surveys. It may also be used to collect audience ratings information. With an appropriate point-of-purchase device, for example, may be used to distribute electronic coupons.

The secondary program guide application running on wireless communications device 406 may provide a user with an opportunity to coordinate the functions of the primary guide with the functions of the secondary guide, thereby extending the interactivity of the primary and secondary guides.

The touch sensitive display of wireless communications device 406 becomes an integrated part of the on-screen guide. Complimentary interactivity between the primary and secondary guides may be provided for various program guide functions without interrupting television viewing. For example, browsing through channels and times, accessing program information, ordering pay-per-view programs, setting reminders, and locking programs may all be performed by the user with wireless communications device 406 (FIG. 4) without interrupting the content being displayed on television 36. For more user-involved functions such as setting favorite channels, viewing more than one channel at a time, or setting global parental locks, the display of wireless communications device 406 (FIG. 4) may seamlessly convert to a remote control that allows the user to navigate a primary guide display screen to perform the function. Alternatively, the user may navigate the appropriate menus on the touch-screen display of wireless communications device 406 without at least some of the menus or intermediate screens being displayed on user equipment 402. Once the user completes a command, wireless communications device 406 (FIG. 4) may communicate directly with user equipment 402 (FIG. 4) to execute the final command. For example, if the user wishes to set a favorite channel, the user may navigate to the appropriate menu in the secondary program guide displayed on the touch-screen display of wireless communications device 406 (FIG. 4) and select a favorite channel. During this process, various intermediate screens may not appear on user equipment 402 (FIG. 4). At the end of the process, wireless communications device 406 may communicate directly with user equipment 402 to execute the final command without interrupting the content being displayed on user equipment 402.

Figure 7:
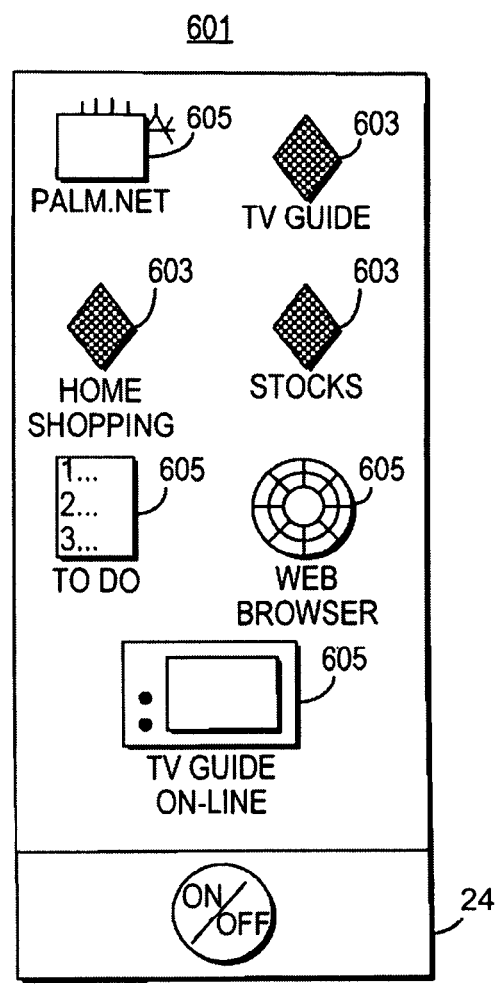
FIG. 7 shows an illustrative menu screen in accordance with an embodiment of the present invention.

FIG. 7 shows an illustrative menu screen 601 that may be displayed by wireless communications device 406 (FIG. 4) when, for example, device 406 starts up. Menu screen 601 may include a number of icons 603 that indicate secondary applications that have functionality coordinated with primary applications running on user equipment 402. Menu screen 601 may also include icons 605 that indicate other applications that run exclusively on wireless communications device 406, if desirable. A user may access a secondary program guide application by, for example, touching a TV Guide icon with his or her finger or stylus.

Figure 8:
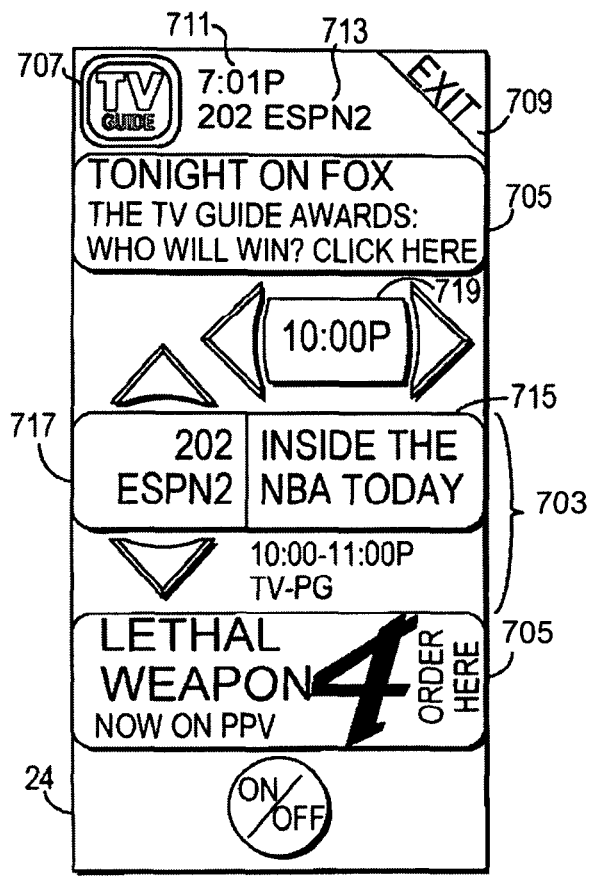
FIG. 8 shows an illustrative browse display in accordance an embodiment of with the present invention.

FIG. 8 shows an illustrative browse display screen 701 that may be displayed by the secondary program guide running on hand-held access device 406. Browse display screen 701 may be displayed, for example, on startup, or after the user selects a suitable icon from menu screen 601. Browse display screen 701 may include browse area 703 in which a program title 715 for the browsed channel 717 and time slot 719 is displayed. Browse area 703 may also include the broadcast time of the program associated with the listing, and its rating. The current time 711 and channel 713 may also be displayed.

A user may browse program listings for other time slots and channels by touching right, left, up, and down arrows 721. A user may tune to the browsed channel by, for example, touching channel 717. When a user touches channel 717, the secondary program guide may exchange one or more application communications with the primary guide via communications path 424 telling the primary guide that the user has indicated a desire to tune to a particular channel. The primary guide may cause user equipment 402 (FIG. 4) to tune to the indicated channel. In another suitable approach, wireless communications device 406 may be programmed to change the channel on user equipment 402 (FIG. 4).

The controls in browse display screen 701 may also be used to perform any other suitable function. The user may touch time 719 or channel 717 to, for example, enter a by-time or by-channel listings screen. In still another suitable approach, the user may touch time 719 and wireless communications device 406 may present a numeric keypad or a list of times separated by, for example, one-half hour time slots, to provide the user with an opportunity to indicate a time for which the user wishes to browse listings. In response to the user touching channel 717, wireless communications device 406 may present a numeric keypad or a list of channels to provide the user with an opportunity to indicate a channel for which the user wishes to browse listings.

Browse display screen 701 may include selectable advertisements 705. Selectable advertisements 705 may, for example, include text and graphics advertising a program or other television or non-television products or services. When a user selects a selectable advertisement 705, the secondary guide may display information (e.g., pay-per-view ordering information, program information, etc.) or take other actions related to the content of the advertisement. The secondary guide may, for example, cause user equipment 402 (FIG. 4) to tune to a barker type channel on which a trailer for an advertised pay-per-view program is displayed. Alternatively, the secondary guide may use one or more application communications to indicate to the primary guide that the user has selected an advertised for a pay-per-view program. The primary guide may then tune user equipment 402 (FIG. 4) to the associated barker channel. While the barker channel is being played on user equipment 402, the secondary guide may provide a user with an opportunity to order the pay-per-view program.

Alternatively, in various embodiments, when a user selects a selectable advertisement 705, the secondary guide may display information (e.g., pay-per-view ordering information, program information, etc.) or take other actions related to the content of the advertisement without interrupting the content being displayed on television 36. Using the example above, the secondary guide may display the barker channel and provide the user with an opportunity to order the pay-per-view program on the touchscreen display of wireless communications device 406 without interrupting the content being displayed on television 36.

Browse display screen 701 may also include logo 707 for providing a user with an opportunity to access the primary program guide running on interactive television application equipment 17. The user may touch exit icon 709 to return wireless communications device 406 to its default state (e.g., power it down, return to main menu screen 601, etc.). If desired, browse display screen 701 may include other controls suitable for browsing listings. Browse display screen 701 may include, for example, next program, previous program, hour ahead, hour back, day ahead, day back, and current time controls. When selecting channels, browse display screen 701 may include, for example, next and previous favorites buttons to allow the user to indicate a desire to browse listings for favorite programs. Any other suitable control may also be used.

Figure 9:
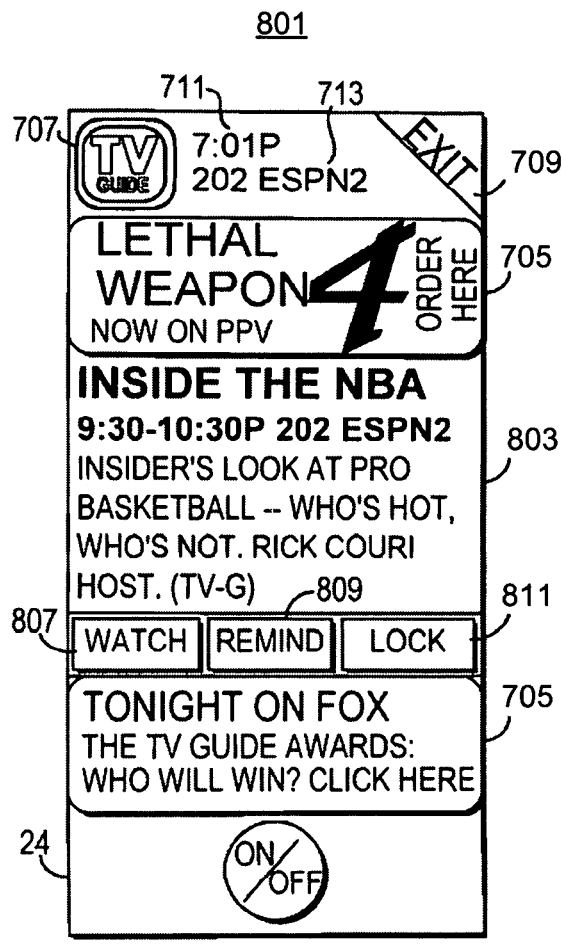
FIG. 9 shows an illustrative information screen in accordance with an embodiment of the present invention.
Figure 10:
FIG. 10 shows an illustrative pay-per-view ordering screen in accordance with an embodiment of the present invention.

FIG. 9 shows an illustrative information screen 801 that the secondary program guide may display when, for example, the user touches a program title 715 from browse display screen 701 of FIG. 8, or when the user selects a selectable advertisement 705. Information screen 801 may include information 803 about the program indicated by the selected listing. Information screen 801 may also include selectable advertisements 705, the current time 711, the current channel 713, logo 707, and exit icon 709. When the user accesses information screen 801 by selecting a selectable advertisement 705, only the selected selectable advertisement may remain on the screen. The secondary program guide may provide a user with an opportunity to access other familiar program guide features for the indicated program from information screen 801, such as tuning to the program (by touching watch button 807). Upon touching watch button 807, the user may be presented with an option to watch the program either on television 36 or on display of wireless communications device 406. If the user selects to watch the program on the screen of wireless communications device 406, the program maybe streamed, for example, from set-top box 28 or a local media server (not shown) in the user's home via a Wi-Fi or Bluetooth link.

The secondary guide may provide a user with an opportunity to set reminders. The user may set a reminder for the indicated program by, for example, touching remind control 809. When the user sets a reminder using wireless communications device 406, the secondary guide may coordinate the reminder with the primary guide. The secondary guide may, for example, indicate the program for which the reminder is set to the primary guide by exchanging one or more application communications via path 424 (FIG. 4). At an appropriate time (e.g., ten minutes before the program starts), the secondary guide may display a reminder on wireless communications device 406 and the primary guide may display a reminder on television 36. To conserve memory on wireless communications device 406, reminders may be set by the secondary guide with the primary guide and not stored by the secondary guide. When the reminder is displayed by the primary guide, the primary guide may exchange one or more application communications with the secondary guide indicating that a reminder is due for a given program. The secondary guide may display a reminder accordingly.

Hand-held application device 406 may provide the user with an opportunity to configure the time at which a reminder is displayed. The user may schedule reminders for, for example, between one and fifteen minutes before a program is available. If desired, reminders may be provided by wireless communications device 406 and user equipment 402 at different default or user-configured times. In still another approach, reminders may be provided by only one of wireless communications device 406 and user equipment 402.

The secondary guide may provide a user with an opportunity to parentally lock or unlock program titles, channels, ratings, or time periods. The user may indicate a desire to parentally lock an indicated program or one of its attributes (e.g., title, rating, channel, etc.) by, for example, touching lock control 811. Locking or unlocking a program title, channel, rating, or time period may be an involved function in some program guides from a user interaction standpoint. When a user indicates a desire to lock or unlock a program title, channel, rating, or time period the secondary program guide may exchange one or more application communications with the primary program guide that indicate to the primary guide that the user wishes to lock or unlock a given program title, channel, rating, or time period. The secondary guide may then convert to a remote control that allows the user to navigate within a primary guide parental control display screen. In guides where parentally controlling a program is not very involved, the secondary guide may provide the user with an opportunity to lock or unlock a program by title, channel, genre, rating, or example.

The secondary guide may also provide a user with an opportunity to change a parental control code. When a user changes a parental control code, the secondary guide may indicate to the primary guide the changing of the code and the new code, using one or more application communications. The primary guide may then change the parental control code accordingly.

If desired, information screen 801 may include a more control button (not shown) in addition to or instead of controls 807, 809, and 811. In response to a user touching more control, wireless communications device 406 may provide controls for additional features. Additional controls may include, for example, pay-per-view ordering controls, other air time controls, or any other suitable control.

Figure 11:
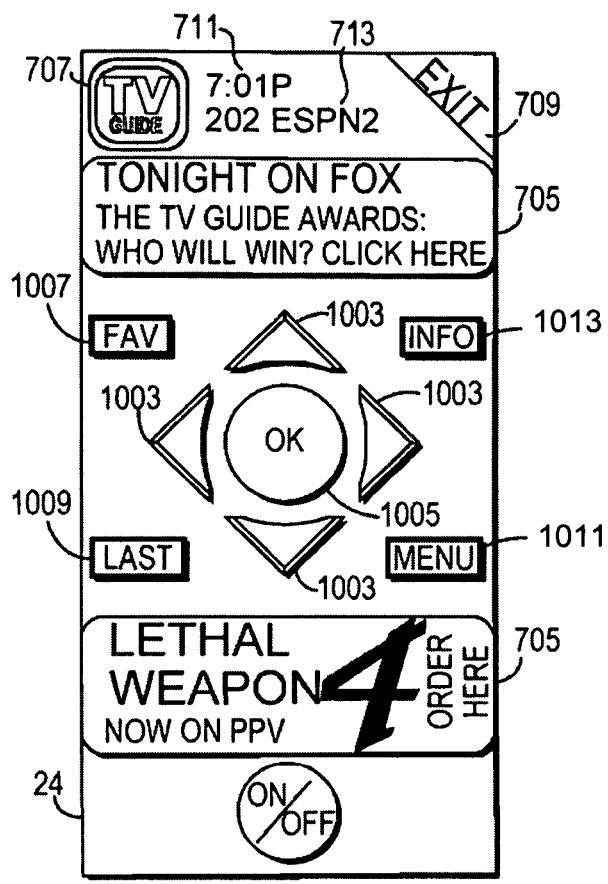
FIG. 11 shows an illustrative remote screen in accordance with an embodiment of the present invention.

The secondary guide running on wireless communications device 406 may provide a user with an opportunity to order pay-per-view programs. A user may indicate a desire to order a pay-per-view program by, for example, touching a selectable advertisement 705 that advertises a pay-per-view program. FIG. 11 shows an illustrative pay-per-view ordering screen. As with other display screens displayed by the secondary guide on wireless communications device 406, pay-per-view ordering screen may include brand logo 707, exit control 709, the current time 711, and current channel 713. Pay-per-view ordering screen 901 may also include ordering information 907. Ordering information 907 may include the title of the selected program, the air time 911 for the selected showing, the price, a brief description, the rating of the pay-per-view program, and any other suitable information.

Pay-per-view ordering screen 901 may also include selectable advertisements 705. A single selectable advertisement 705 may be displayed when, for example, the user accesses a pay-per-view ordering screen by selecting a selectable advertisement. The single selectable advertisement may not be actionable. When the user accesses the screen by, for example, selecting a pay-per-view program title, two selectable advertisements 705 may be displayed. When a user selects one of the two selectable advertisements 705, the secondary guide may display a program information screen for an advertised program.

When screen 901 is initially displayed, run time 911 for the indicated pay-per-view program may start at the next available start time 913. The user may see additional air times by, for example, touching left arrow 903 or right arrow 905. When the user selects a different start time 913, the secondary guide may display ordering information 907 for the selected start time.

The secondary guide may provide a user with an opportunity to navigate within the primary guide and access features of the primary guide using wireless communications device 406. A user may indicate a desire to access the primary guide by, for example, touching logo 707. FIG. 11 shows an illustrative remote screen 1000. Remote screen 1000 may include, for example, logo 707, selectable advertisements 705, current time 711 and current channel 713. When a user selects logo 707 from within remote screen 1000, the secondary guide may instruct the primary guide to display a program listings screen on television 36. The controls of remote screen 1000 may be based on and displayed according to the screen displayed by a primary guide or other application, the option highlighted on a particular primary application screen, the content or type of information displayed in a primary application screen, or any other suitable feature, group of features, or content.

The user may navigate within a primary guide display screen by, for example, touching arrows 1003. Navigation within a program guide display screen using wireless communications device may be performed within any primary guide display screen.

The secondary program guide may provide a user with an opportunity to navigate within the primary program guide in other ways. The secondary guide may provide a user with an opportunity to set channels as favorites on the secondary guide, the primary guide, or both. The user may, for example, navigate between listings set as favorites by touching "FAV" 1007. Alternatively, the secondary guide may re sort program listings with the favorite channels in the most prominent or convenient position as displayed on wireless communications device 406 (FIG. 4) or user equipment 402 (FIG. 4).

The user may back up one previous primary guide display screen by, for example, touching "LAST" 1009. The user may return to primary guide main menu screen 100 by, for example, touching "MENU" 1011. The user may return to watching television by, for example, touching "EXIT" 709. A user may indicate a desire to view program information for a particular listing by, for example, positioning highlight region 150 over the listing and touching "INFO" 1013. Other illustrative controls that may be displayed by the secondary guide on wireless communications device 406 when a user highlights a program listing from within a listings screen or other display screen may include controls for: setting a reminder, locking a program, ordering the program if it is a pay-per-view, seeing other air times of the program, or ordering program-related merchandise such as a CD of the soundtrack, a videotape of the program, or apparel carrying the program's brand.

The secondary guide may also provide a user with an opportunity to define what objects are displayed on wireless communications device 406 (FIG. 4). The user may choose, for example, a help control button that invokes context sensitive help, a message flag that indicates that wireless communications device 406 (FIG. 4) or the user's television equipment 402 (FIG. 4) has received an e-mail, a VCR button, a DVD button, or a power off button that turns off all of user equipment 402 (FIG. 4) and devices connected to user equipment 402 (FIG. 4).

The functionality of the primary guide may be extended to or coordinated with the secondary guide for any number of other suitable program guide related features. The secondary guide may provide a user with an opportunity to use wireless communications device 406 (FIG. 4) to, for example: send and receive e-mail (related to the guide, such as promotional messages from the cable operator, or unrelated to the guide, such as personal messages); buy merchandise; bid on a televised auction; order subscriptions services such as HBO; pay a cable bill; make a financial transaction for someone at a different household (such as renting a PPV movie for another, or making any other guide-based financial transaction); effect Internet based e-commerce (e.g., order merchandise, participate in an on-line auction or reverse auction, etc.), or surf the Internet. These and other features may be incorporated at least in part into wireless communications device 406 (FIG. 4).

Another function that may be coordinated between the primary and secondary guides using wireless communications device 406 (FIG. 4) is the control of a picture-in-picture (PIP) display. A PIP display is a small partial-screen video window of one channel's video overlaid on top of another channel's video that is displayed full-screen. Using the browse function of the secondary guide, the user could browse channels and program titles on wireless communications device 406 and watch the same channels in the PIP, while other viewers can continue to watch the tuned channel on the main screen. The secondary guide may also provide a user with an opportunity to call up on-demand movie trailers, TV commercials and other downloaded video within the PIP window using wireless communications device 406 (FIG. 4).

The secondary guide (or other software running on wireless communications device 406 (FIG. 4)) may also provide a user with an opportunity to control the PIP in multi-person video conferencing. For example, in a three-way video conference the user could switch views between the two other user locations by touching suitable controls on wireless communications device 406 (FIG. 4). In a two-way video conference, for example, the user may use wireless communications device 406 (FIG. 4) to alternate between viewer locations in the PIP display.

Wireless communications device 406 (FIG. 4) may have suitable processing circuitry so as to display video. A video signal may be streamed, for example, as an MPEG-2 data stream to wireless communications device 406 for display via a Wi-Fi or Bluetooth link. Video displays may also be streamed to wireless communications device 406 (FIG. 4) as a user browses through program listings using the secondary guide. In this approach, the video display may include video for a program that has its listing displayed and that is being broadcasted at the time of the browse. If system resources do not permit the streaming of video, still shots may be transmitted from user equipment 402 (FIG. 4) to wireless communications device 406 (FIG. 4) for display instead. In another suitable approach, highly compressed videos may be used to account for bandwidth constraints. Using highly compressed videos may also be desirable when, for example, the resolution of the display of wireless communications device 406 (FIG. 4) would not support high-resolution video.

Additionally, in various embodiments, the user may watch a program on user equipment 402 (FIG. 4) while watching a different program on wireless communications device 406 (FIG. 4). For example, a program may be streamed from a media-server to wireless communications device 406 (FIG. 4) while a different program may be provided by set-top box 28 to television 36. Wireless communications device 406 (FIG. 4) may provide the user with an option to switch the programs being displayed on the respective screens. For example, during a commercial in the program being displayed on television 36, the user may touch a button on wireless communications device 406 (FIG. 4) to switch the programs being displayed on television 36 and wireless communications device 406 (FIG. 4). At the end of the commercial, the user may touch the button again to switch the programs being displayed on television 36 and wireless communications device 406 (FIG. 4).

Some applications may be exclusively run on wireless communications device 406. Wireless communications device 406 may run, for example, an on-line program guide client. A user may indicate a desire to access an on-line program guide by, for example, touching TV Guide On-line from menu screen 601 (FIG. 7). When a user indicates a desire to access an on-line program guide, wireless communications device 406 (FIG. 4) may launch an Internet browser and access a suitable web site. Alternatively, a proprietary Web browser or other remote access software may be launched in order to access a web site or other proprietary site that provides web access for a wireless communications device.

Another example of an application that may run on wireless communications device 406 (FIG. 4) is a program recommendations application. The program recommendations application may obtain data from user equipment 402 and/or user computer equipment 404 to determine what the user is watching and make real-time suggestions for programs on the touch screen of wireless communications device 406 (FIG. 4). For example, if the user is watching the Olympics, wireless communications device 406 (FIG. 4) may suggest other sports programs that the user may be interested in. In various embodiments, a secondary program guide running at least in part on wireless communications device 406 (FIG. 4) may query a primary program guide to determine what the user is currently watching on user equipment 402 or to obtain user profile information stored, for example, in storage 308 (FIG. 3). Wireless communications device 406 (FIG. 4) may then obtain program recommendations from the Internet (e.g., from a remote media server) based on the information obtained from the primary program guide. Recommendation display screens may be displayed simultaneously with any of the information displayed in FIGS. 7-15.

In various embodiments, wireless communications device 406 (FIG. 4) may determine what the user is watching based on how wireless communication device 406 (FIG. 4) was used by the user. For example, if wireless communications device 406 (FIG. 4) was used to start playback of "Batman" from a local media server, wireless communication device 406 (FIG. 4) may thus, based on this information, recommend "The Dark Knight". In addition, in various embodiments, wireless communications device 406 (FIG. 4) may present the user with an opportunity (e.g., by displaying a link on touch screen display of wireless communications device 406 (FIG. 4) to a website to purchase the DVD) to buy "The Dark Knight". Additionally, wireless communications device 406 may download a trailer for "The Dark Knight" to be viewed by the user when the current movie (e.g., "Batman") is over. The trailer may be stored on user equipment 402 or on wireless communications device 406 (FIG. 4).

In various embodiments, wireless communications device 406 (FIG. 4) may be used to access a website to obtain more information about the content being accessed on user equipment 402 (FIG. 4). For example, if the user is playing a movie from a Blueray disc, the user may access the movie studio's website to obtain more information regarding, for example, the sound track of the movie, the actors in the movie, or link to various community-based services.

Figure 12:
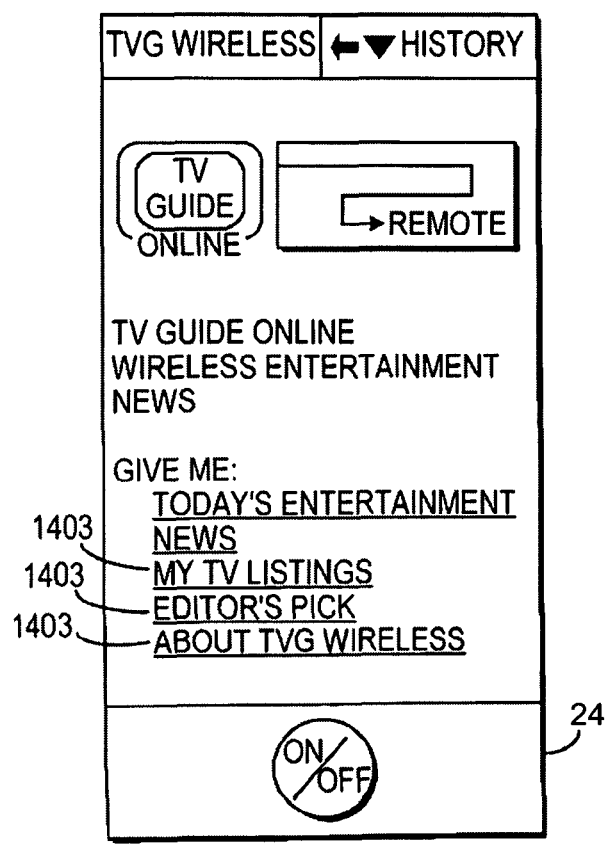
FIG. 12 shows an illustrative home page in accordance with an embodiment of the present invention.
Figure 13:
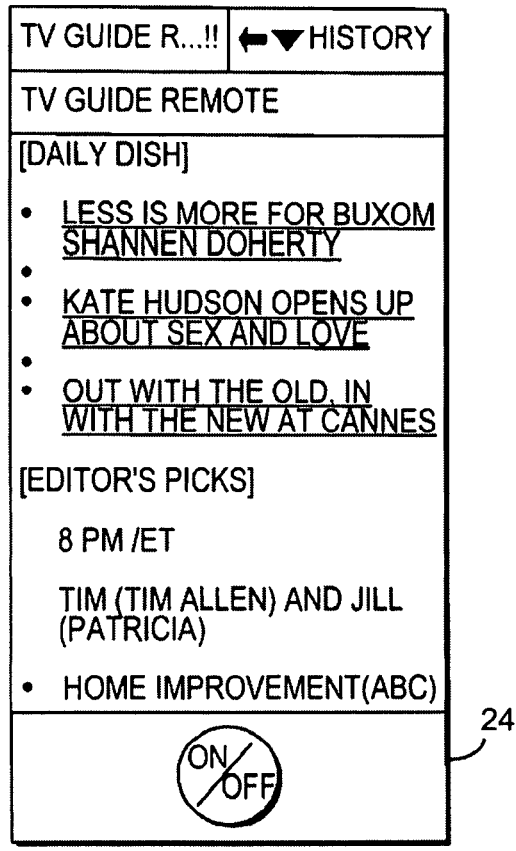
FIG. 13 shows an illustrative Editor's Picks page in accordance with an embodiment of the present invention.

FIG. 12 shows an illustrative home page 1401 for a wireless communications device web site. When a user selects a link 1403 or other suitable type of anchor, wireless communications device 406 may download a HyperText Markup Language (HTML) page using the HyperText Transfer Protocol (HTTP). Any other suitable protocol may be used. In still another suitable approach, wireless communications device 406 may use suitable remote access software such as a Windows remote access software (RAS) client to download screen shots or screen shot commands, from a server (i.e., an Internet server that provides Internet access via a remote access client). Alternatively, or in addition, wireless communications device 406 may obtain screen shots using a second or third tuner in television 36 (FIG. 6). FIG. 13 shows an illustrative page that wireless communications device 406 may display when, for example, a user selects a "Editor's Picks" anchor.

Figure 14A:
FIGS. 14a and 14b show illustrative My TV Listings pages in accordance with an embodiment of the present invention.
Figure 14B:
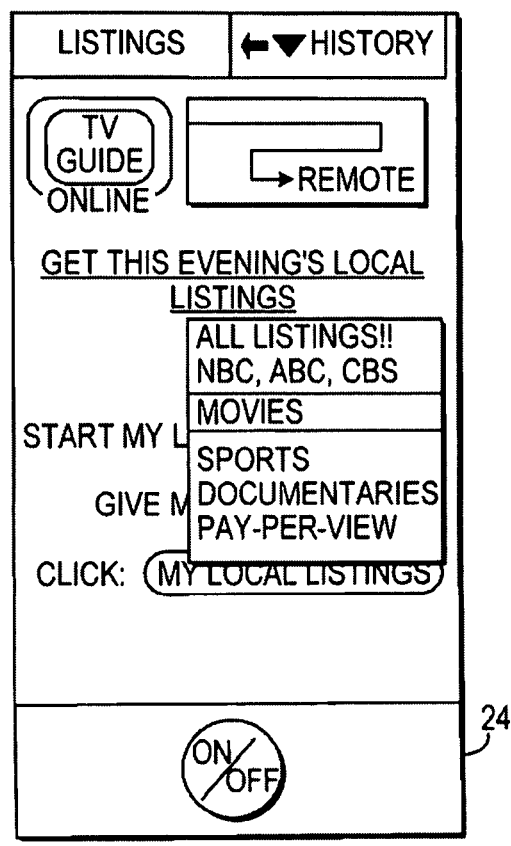
Figure 14C:
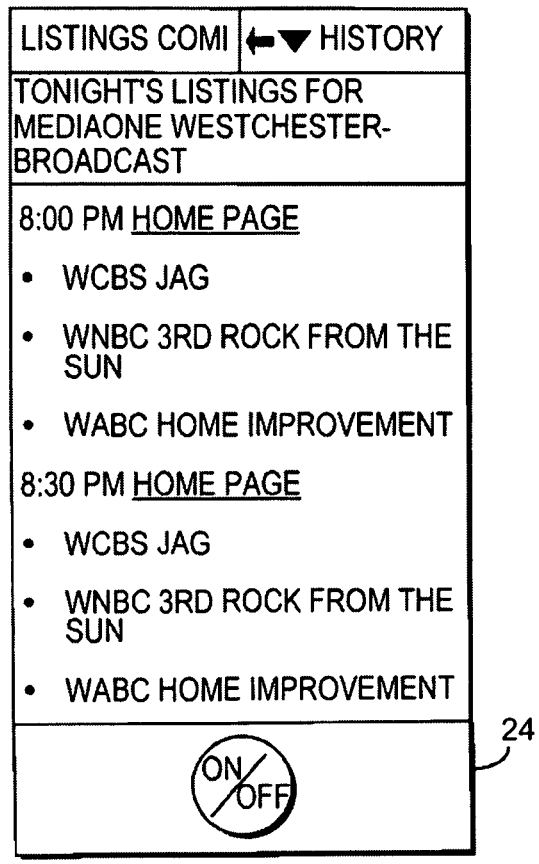
FIG. 14c shows an illustrative page of program listings by criteria in accordance with an embodiment of the present invention.

FIGS. 14a and 14b show illustrative pages that wireless communications device 406 may display when, for example, a user selects "My TV listings" anchor 1403. As shown, the on-line guide client, Web browser, or other access application running on wireless communications device 406 may provide a user with an opportunity to view program listings sorted according to one of a number of user selected criteria. When a user selects criteria, the on-line guide client, Web browser, or other Internet access application may retrieve program listings for the selected criteria and display the listings as shown in FIG. 14c. If desired, program listings may be downloaded based on the user's profile, zip code, cable system, satellite service, or other suitable criteria, so that the user views program listings for programs available to the user and for the proper time zone. Users may also be provided with an opportunity to limit the listings by time, genre, favorites, or any other suitable criteria.

Figure 15:
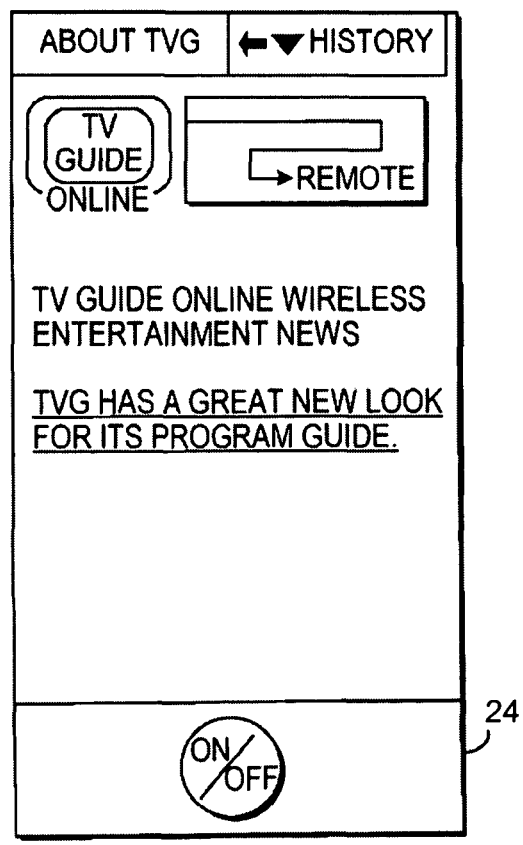
FIG. 15 shows an illustrative about page in accordance with an embodiment of the present invention.

The on-line guide client, Web browser, or other access application running on wireless communications device 406 may also provide a user with an opportunity to view information about the application. FIG. 15 shows an about page that wireless communications device 406 may display when, for example, a user selects an "About TVG Wireless" anchor 1403, or other suitable anchor, from home page 1401 of FIG. 12.

Figure 16:
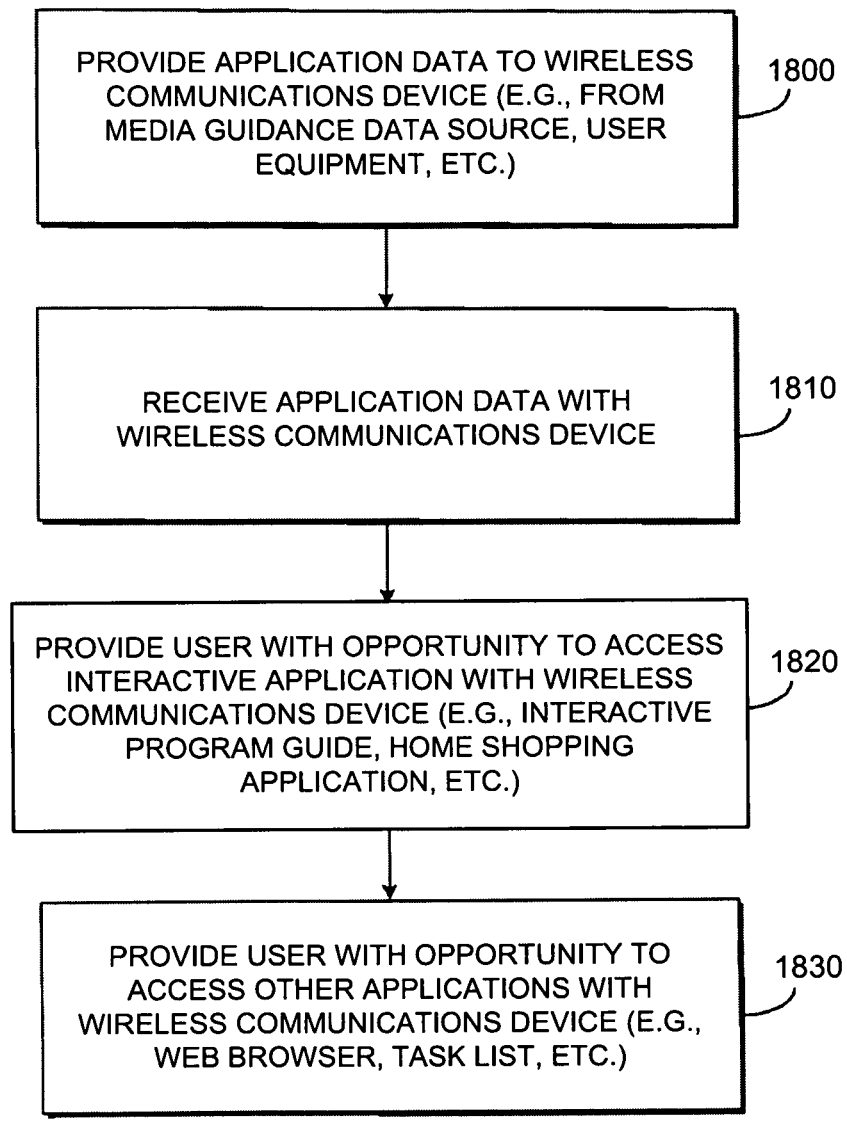
FIG. 16 is a flowchart of illustrative steps involved in providing interactive media guidance and other application features with the wireless communications device of FIG. 4 in accordance with an embodiment of the present invention.

FIGS. 16-19 are flowcharts of illustrative steps involved in providing stand-alone and coordinated application features on wireless communications device 406 (FIG. 4). The steps shown in FIGS. 16-19 are illustrative and in practice may be performed in any suitable order. FIG. 16 is a flowchart of illustrative steps involved in providing interactive television and other application features with wireless communications device 406 (FIG. 4). At step 1800, application data, such as interactive television application data or data for other applications, is provided to wireless communications device 406. The data may be provided directly from media guidance data source 418 (FIG. 4) to wireless communications device 406 (FIG. 4), media guidance data source 418 (FIG. 4) to wireless communications device 406 (FIG. 4) via user equipment 402 (FIG. 4), or directly from user equipment 402 (i.e., data that originates from user equipment 402). The interactive television application data may include any data suitable for interactive media guidance or other applications. Interactive media guidance applications may include, for example, applications that provide information related to programming or that provide interactive features associated with programming, such as, for example, interactive television program guides, home shopping applications, e-mail, wagering and financial trading applications. As illustrative examples, home shopping applications and financial trading applications may be interactive applications when features of such applications are provided via user equipment. The features of these applications may be provided with programming related to the features. A home shopping application may, for example, provide purchasing opportunities for products and services featured on a home shopping television channel.

Wireless communications device 406 (FIG. 4) may receive application data (step 1810) and provide a user with an opportunity to access the media guidance application with wireless communications device 406 (step 1820). The interactive media guidance application may run as a stand alone application, as a client that requests data from a server (e.g., a server at media guidance data source 418 or user equipment 402), or cooperatively with a primary application running within user equipment 402. At step 1830, wireless communications device 406 may provide the user with an opportunity to access other applications such as, for example, PDA-type functions. For example, it may support e-mail, a calendar, a contact list, web browsing, a calculator, etc. It may support data services, such as news, weather, sports, traffic, or any other suitable data service. Such applications may also be provided as stand alone or server applications running on user equipment 402 and accessible by wireless communications device 406. With suitable hardware resources, the secondary program guide might include advanced communication functions. For example, it might allow a user to remotely monitor the home equipment—find out if the system is turned on, what channel is on, etc. It might also allow a user to listen to audio from a selected TV channel, or offer audio channels.

Figure 17:
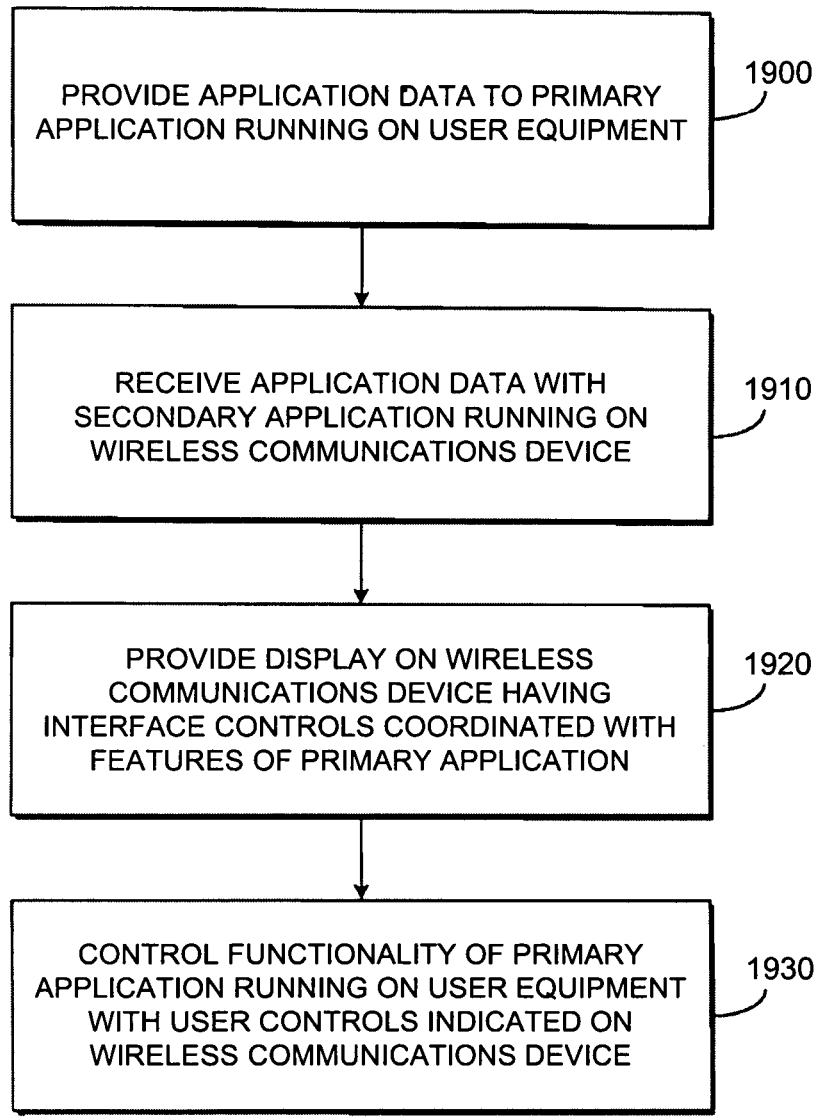
FIG. 17 a flowchart of illustrative steps involved in coordinating features between primary applications running within the user equipment of FIG. 4 and secondary applications running on the wireless communications device of FIG. 4.

FIG. 17 is a flowchart of illustrative steps involved in coordinating features between primary applications running within user equipment 402 and secondary applications running on wireless communications device 406. At step 1900, media content source 416 or media guidance data source 418 provides application data to a primary application running on user equipment 402. The primary application may be an interactive media guidance application. At step 1910, the primary application provides the application data to a secondary application running on wireless communications device 406 using, for example, one or more communications paths (FIG. 4). At step 1920, the secondary application running on wireless communications device 406 provides a display of interface controls that are coordinated with the features of the primary application. For example, the interface controls may correspond with navigational features of the primary application. The illustrative remote screen 1000 of FIG. 10, for example, includes navigational arrows 1003 to correspond to navigational features of an interactive program guide running on user equipment 402. The user interface also includes controls for interactive guide features, such as favorites, last, more information, and menu. In a home shopping application, for example, user interface controls may include similar navigational controls, and may include other controls for home shopping features such as purchasing, information, putting items on wish lists, or any other suitable home shopping feature. In a home stock trading application for example, user interface controls may include similar navigational controls and may include other controls for features such as buying stocks, selling stocks, more information, or any other suitable feature. In a web browser application, for example, similar navigational controls and other controls for, for example, back, forward, home, bookmark, or any other suitable feature may be provided. In a wagering application, for example, user interface controls may be provided for wagering, providing additional information regarding wagering opportunities, or any other suitable feature.

The interface controls may be coordinated with the features of the secondary application using the data provided by the primary application. In this way, user interface controls may be dynamically configurable based on the primary application. If desired, a library of standard controls may be stored by wireless communications device 406 so that the user is provided with a consistent interface across primary applications. Controls that are specialized for particular primary applications may be downloaded if desired.

Another example of coordinating interface controls with features of a primary application is providing primary application content on wireless communications device 406. In an interactive program guide application, for example, wireless communications device 406 may display television programming when, for example, the user browses listings while watching a program on user equipment 402.

At step 1930, the secondary application controls the functionality of the primary application based on the user controls selected by the user as indicated on wireless communications device 406. This may be accomplished by, for example, exchanging one or more access communications with the primary application. In a home shopping application, for example, the primary application may initiate a purchase sequence in response to a user selecting a purchase control on wireless communications device 406. In a stock trading application, for example, the primary application may sell stock in response to a user selecting a sell control on wireless communications device 406. In a web browser, for example, the system may go back to a previously accessed web page in response to a user selecting a back control.

Figure 18:
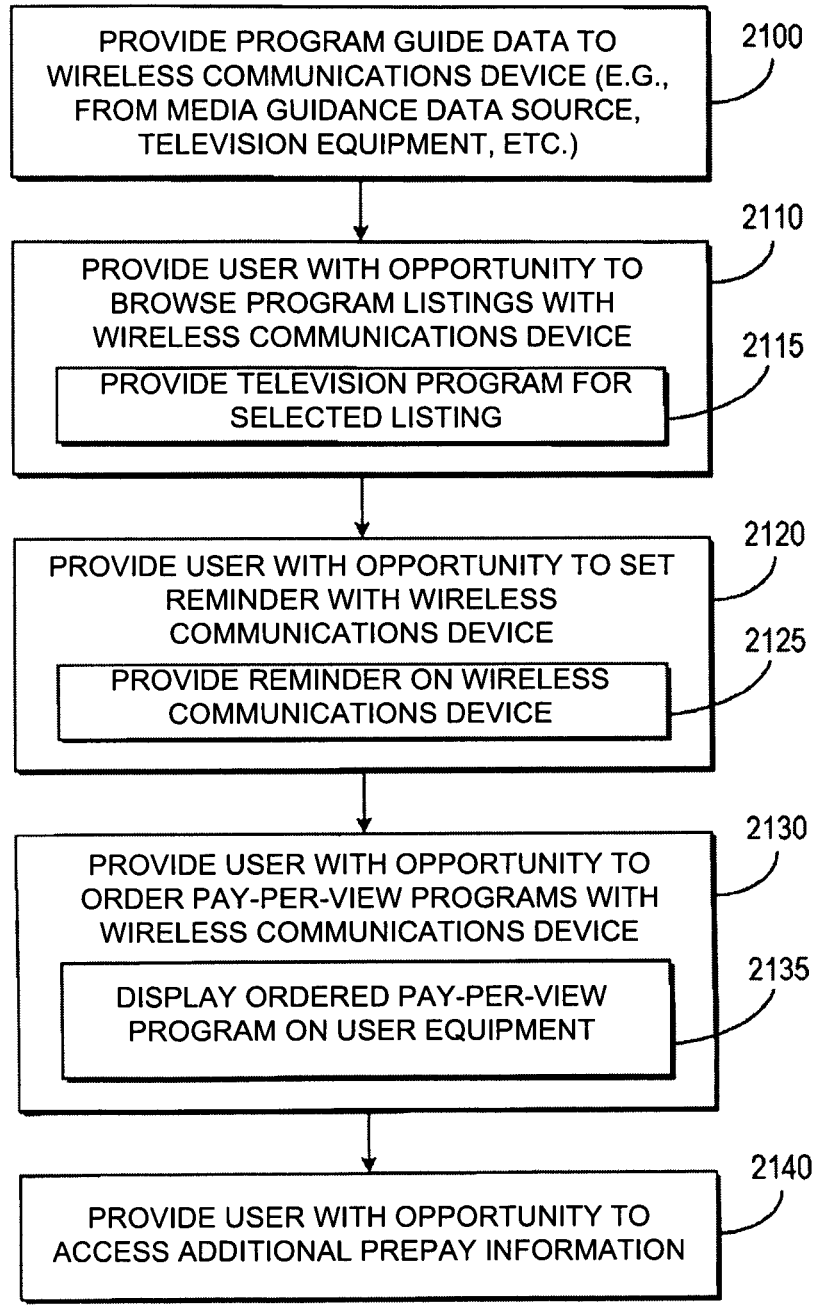
FIG. 18 is a flowchart of illustrative steps involved in providing interactive media guidance application functionality using the wireless communications device of FIG. 4.

FIG. 18 is a flowchart of illustrative steps involved in providing interactive program guide functionality using wireless communications device 406. At step 2100, program guide data is provided to wireless communications device 406. The data may be provided directly from media guidance data source 418 to wireless communications device 406, from media guidance data source 418 to wireless communications device 406 via user equipment 402, or directly from user equipment 402 (i.e., data that originates from user equipment 402). At step 2110, wireless communications device 406 provides the user with an opportunity to browse program listings. This may be accomplished independently, as a client to a primary server application running on a portion of user equipment 402, or cooperatively with a primary application running on a portion of user equipment 402. Wireless communications device 406 or user equipment 402 may provide television programming in response to the user selecting a browsed listing (step 2115).

At step 2120, wireless communications device 406 may provide the user with an opportunity to set reminders. Reminders may appear on hand-held access device 406, with both an audio alert and a display (step 2125). Via a paging return, for example, the device can be used to set reminders remotely with an interactive program guide resident on user equipment 402.

At step 2130, wireless communications device 406 may provide the user with an opportunity to order pay-per-view or on-demand programs. A user may indicate a desire to order pay-per-view or on-demand programs by, for example, selecting listings on wireless communications device 406, selecting advertisements on wireless communications device, or by performing any other suitable function. Ordered pay-per-view or on-demand programs may be provided on wireless communications device 406, or may be provided on user equipment 402 (step 2135).

At step 2140, wireless communications device 406 may provide the user with an opportunity to view additional programming information. A user may indicate a desire to view additional programming information by, for example, selecting a program listing, selecting an advertisement (e.g., as shown in FIG. 9), or by selecting any other suitable control. The additional information may be provided on wireless communications device 406, or may be provided on user equipment 402 (step 2145).

Figure 19:
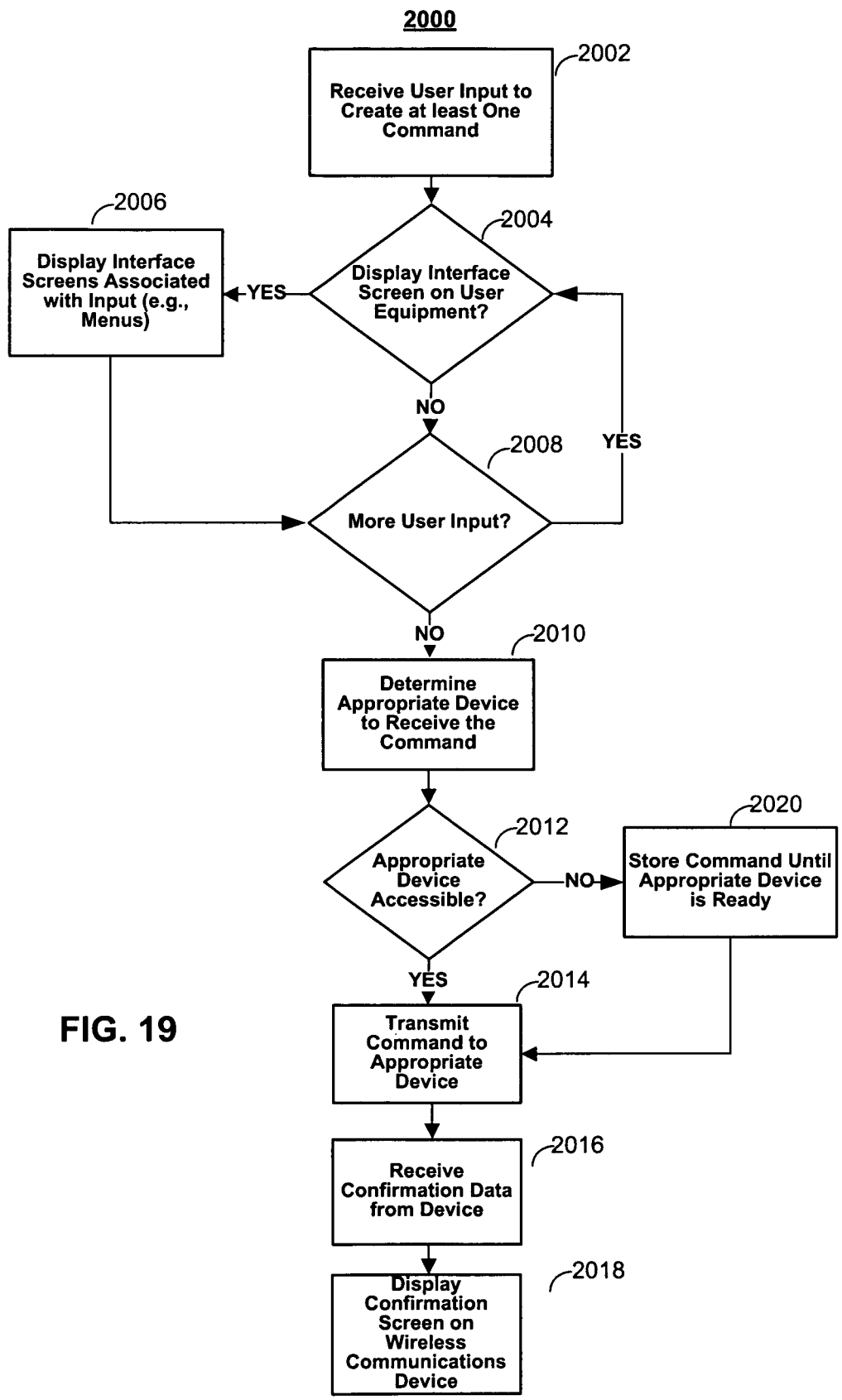
FIG. 19 is a flowchart of illustrative steps involved in executing a command on user equipment using the wireless communications device of FIG. 4.

FIG. 19 is a flowchart of illustrative steps involved in executing a command on user equipment 402 (FIG. 4) using wireless communications device 406 (FIG. 4). At step 2002, user input may be received on wireless communications device 406 to create at least one command. The command may be a media guidance application command, such as for example, setting a favorite channel, setting a parental lock, scheduling a recording, setting a reminder, performing a search for media content, or any other suitable media guidance application command. Additionally, the command may be a basic command, such as for example, a power on/off command, a channel change command, a playback command, a recording command, or any other suitable command. User input may include, for example, a user touching keys displayed on a touch screen of wireless communications device 406 (FIG. 4). Wireless communications device 406 may simultaneously display advertisements while receiving user input to create a command. The advertisements may be targeted based on a type of command or based on user input itself. For example, if the user is inputting a search string to search for comedy programs, wireless communications device 406 may display advertisements for comedy programs. At step 2004, wireless communications device 406 may determine whether to display an interface screen (e.g., a menu) associated with the user input. Fox example, if the user input is simply a "channel up" command, wireless communications device 406 may not display any interface screens. However, if the user input is to access a menu in order to perform a more complicated function such as, for example, setting a favorite channel, setting a reminder, setting a parental lock or creating a search string, then one or more intermediate interface screens (e.g., menus) may not be displayed on user equipment 402 in order not to interrupt the content being displayed on user equipment 402. Wireless communications device 406 may also display advertisements on the wireless communications device while the user input is being received. Additionally, if, for example, the user input is a search string, wireless communications device 406 may provide recommendations of search terms based on the user's viewing history and/or the user's profile information. The user's profile information may automatically be retrieved by wireless communications device 406 based on which user has activated wireless communications device. Wireless communications device 406 may determine the identity of the user based on for example, log-in information, time of day, viewing habits or any other suitable identification technique.

If the user continues to enter more commands, step 2008 may revert back to step 2002 to receive further user input. If however, the user is finished entering commands, step 2008 may advance to step 2010. At step 2010, wireless communications device 406 may determine the appropriate device to receive the command entered by the user. For example, wireless communications device 406 (FIG. 4) may determine if television 36 (FIG. 6), set-top box 28 (FIG. 6), or user computer equipment 404 (FIG. 4) should receive the command. Wireless communications device may determine the appropriate device based at least in part on the command entered, the supported playback and recording formats of each of the devices (e.g., high-definition, standard definition, and H.264), and/or the distance of the devices from wireless communications device 406 (FIG. 4). For example, in some embodiments, the device closest to wireless communications device 406 (FIG. 4) may be selected to be the appropriate device to receive and execute the command. In other embodiments, the distance to the device and the type of command (e.g., power on/off command, channel change command, a playback command, and a recording command) are both used to determine the appropriate device to receive and execute the command. For example, commands involving a tuner (e.g., a channel up command) may be sent to set-top box 28 (FIG. 6) while commands involving a website may be sent to user computer equipment 404 (FIG. 4). GPS or a Wi-Fi location based service may be used to determine the proximity of the devices from wireless communications device 406. Additionally, the supported playback or recording formats of the user equipment devices may also be used to select the appropriate device. For example, if a user enters a command to playback HD content, and the user owns two televisions, one of which does not support HD playback, wireless communications device 406 may select the television capable of playing back HD content as the appropriate device.

Once wireless communications device 406 determines the appropriate device to receive the command, wireless communications device 406 (FIG. 4), at step 2012, may determine if the appropriate device is accessible. For example, it may determine if the appropriate device is within range (in the case of communicating via an IR or Bluetooth link), and/or if it can establish communication with the appropriate device (in the case of communicating via a Wi-Fi link). To determine if the appropriate device is accessible, wireless communications device may attempt to establish a communications session with the device and/or may try to ping the device.

If the appropriate device is accessible, wireless communications device 406 may, in step 2014, transmit the command to the appropriate device. For example, wireless communications device 406 may append an identifier to the command string. The identifier may uniquely identify the appropriate device to execute the command. A device receiving a command not addressed to it may ignore the command. At step 2016, wireless communications device 406 may receive confirmation data from the appropriate device that executed the command. The confirmation data may include, for example, a confirmation display screen, an acknowledgement code or search results. Wireless communications device 406, at step 2018, may then display at least some of the confirmation data on the screen display of wireless communications device 406 (FIG. 4). For example, if the command was a media content search command, at least some of the search results may be displayed at step 2018. Other commands may not generate information to be displayed, in which case step 2018 may be omitted from illustrative process 2000.

If however, wireless communications device 406, at step 2012, determines that the appropriate device is not accessible, wireless communications device 406 may store the command until after the appropriate device becomes accessible in step 2020. While the appropriate device is not accessible, wireless communications device 406 may continue to accept user input for additional commands. Wireless communications device 406 may store one or more commands for the unavailable appropriate device in, for example, storage 56 (FIG. 5) until the appropriate device becomes accessible. After the device becomes accessible, wireless communications device 406 may transmit the one or more commands stored in storage 56 (FIG. 5) to the appropriate device in step 2014. For example, one or more commands may be stored in a command queue while the device is not accessible, and a batch command including one or more of the commands stored in the command queue may be sent to the device after it becomes accessible.

The foregoing is merely illustrative of the principles of this invention and various modifications can be made by those skilled in the art without departing from the scope and spirit of the invention. The above described embodiments of the present invention are presented for purposes of illustration and not of limitation, and the present invention is limited only by the claims which follow.

What is claimed is:

1. A method for controlling user equipment using a wireless communications device, comprising:
   receiving user input to create at least one command on the wireless communications device;
   transmitting an instruction to display on the wireless communications device, at least one interface screen associated with the at least one command without displaying the interface screen on the user equipment;
   transmitting an instruction to display advertisements on the wireless communications device while receiving the user input;
   selecting the advertisements displayed based on a type of the at least one command;
   transmitting the at least one command to the user equipment; and
   receiving confirmation data from the user equipment.

2. The method of claim 1, wherein receiving user input comprises receiving input via a touch sensitive screen on the wireless communications device.

3. The method of claim 1, wherein transmitting the at least one command to the user equipment comprises determining an appropriate user equipment device to execute the at least one command.

4. The method of claim 3, wherein determining the appropriate device comprises determining the appropriate device based at least in part on a type of the at least one command.

5. The method of claim 3, wherein determining the appropriate device comprises determining the appropriate device based at least in part on the proximity of the device from the wireless communications device.

6. The method of claim 1, further comprising displaying a confirmation screen on the wireless communications device.

7. The method of claim 1, wherein the at least one command is selected from the group consisting of setting a favorite channel, setting a reminder, setting a parental lock, scheduling a recording and performing a search for media content.

8. The method of claim 1, wherein the confirmation data comprises one or more of an acknowledgement code, display screen, and search results.

9. The method of claim 1, further comprising providing search recommendations if the user input is a search string.

10. A system for controlling user equipment using a wireless communications device, comprising:
    a wireless communications device; and
    user equipment;
    wherein the wireless communications device is configured to:
      receive user input to create at least one command on the wireless communications device;
      transmitting an instruction to display on the wireless communications device, at least one interface screen associated with the at least one command without displaying the interface screen on the user equipment;
      transmitting an instruction to display advertisements on the wireless communications device while receiving the user input;
      select the advertisements displayed based on a type of the at least one command;
      transmit the at least one command to the user equipment; and
      receive confirmation data from the user equipment.

11. The system of claim 10, wherein the wireless communications device is configured to receive user input via a touch sensitive screen.

12. The system of claim 10, wherein the wireless communications device is further configured to determine an appropriate user equipment device to execute the at least one command.

13. The system of claim 12, wherein the wireless communications device is further configured to determine the appropriate device based at least in part on a type of the at least one command.

14. The system of claim 12, wherein the wireless communications device is further configured to determine the appropriate device based at least in part on the proximity of the user equipment device from the wireless communications device.

15. The system of claim 10, wherein the wireless communications device is configured to display a confirmation screen on the wireless communications device.

16. The system of claim 10, wherein the at least one command is selected from the group consisting of setting a favorite channel, setting a reminder, setting a parental lock, scheduling a recording and performing a search for media content.

17. The system of claim 10, wherein the confirmation data comprises one or more of an acknowledgement code, display screen, and search results.

18. The system of claim 10, wherein the wireless communications device is further configured to provide search recommendations if the user input is a search string.

* * * * *